US012573821B2

(12) United States Patent
Morrison et al.

(10) Patent No.: US 12,573,821 B2
(45) Date of Patent: Mar. 10, 2026

(54) SYSTEMS AND METHODS FOR EMERGENCY ELECTRICAL SYSTEMS REPAIR

(71) Applicant: DIT-MCO International LLC, Kansas City, MO (US)

(72) Inventors: Kurt Morrison, Smithville, MO (US); Scott F. Ruland, Kansas City, MO (US)

(73) Assignee: DIT-MCO International LLC, Kansas City, MO (US)

( * ) Notice: Subject to any disclaimer, the term of this patent is extended or adjusted under 35 U.S.C. 154(b) by 0 days.

(21) Appl. No.: 19/079,146

(22) Filed: Mar. 13, 2025

(65) Prior Publication Data

US 2025/0293493 A1 Sep. 18, 2025

Related U.S. Application Data

(60) Provisional application No. 63/565,732, filed on Mar. 15, 2024.

(51) Int. Cl.
| | |
|---|---|
| *H02G 1/14* | (2006.01) |
| *H02G 1/00* | (2006.01) |
| *H02G 1/06* | (2006.01) |

(52) U.S. Cl.
CPC .................. *H02G 1/14* (2013.01); *H02G 1/00* (2013.01); *H02G 1/06* (2013.01)

(58) Field of Classification Search
CPC .............. H02G 1/00; H02G 1/06; H02G 1/14
See application file for complete search history.

(56) References Cited

U.S. PATENT DOCUMENTS

| | | | | |
|---|---|---|---|---|
| 4,690,475 A | * | 9/1987 | McElroy .............. | G01R 31/007 |
| | | | | 439/502 |
| 5,367,250 A | * | 11/1994 | Whisenand ............ | H01R 11/18 |
| | | | | 324/133 |

(Continued)

FOREIGN PATENT DOCUMENTS

| | | | | |
|---|---|---|---|---|
| CN | 104515920 A | * | 4/2015 | |
| CN | 112782613 A | * | 5/2021 | ............. G01R 31/54 |

(Continued)

OTHER PUBLICATIONS

Translation of CN-104515920-A (Year: 2015).*
Translation of CN-219224857-U (Year: 2023).*
Translation of KR-20210133091-A (Year: 2021).*
Translation of CN-112782613-A (Year: 2021).*
"399 Piece Electrical Repair Kit, Includes Tools, Tester, Terminals, Connectors and Tape in a Organizing Case w/ Handle," Power Products LLC, Aug. 5, 2020 (Aug. 5, 2020), pp. 1-2, XP093283347, Retrieved from the Internet: URL: https://web.archive.org/web/20200805080018/https://www.calterm.com/en/p/05207/399-Piece-Electrical-Repair-Kit.

(Continued)

*Primary Examiner* — Jeffrey T Carley
(74) *Attorney, Agent, or Firm* — Pauly, DeVries Smith & Deffner LLC

(57) ABSTRACT

Embodiments provide a method for repairing an electrical system. The method can include detecting a disruption to the electrical system. The method can include identifying, at a damaged end, a first conductor within a first portion by sending a signal from one of the handheld electronic testers to the other handheld electronic testers through a first conductor. The method can include locating a non-damaged end of the second portion and connecting the non-damaged end of the second portion to a handheld electronic tester. The method can include locating a damaged end of the second portion and connecting the damaged end of the second portion to a handheld electronic tester. The method can include identifying the first conductor within the second portion by sending a signal from one electronic tester to the other electronic testers through the first conductor. The method can include connecting the first connector with the second connector.

10 Claims, 21 Drawing Sheets

(56) References Cited

U.S. PATENT DOCUMENTS

| | | | | | |
|---|---|---|---|---|---|
| 6,230,109 | B1 * | 5/2001 | Miskimins | ............ | G01R 31/50 |
| | | | | | 702/109 |
| 6,459,268 | B1 * | 10/2002 | Lutz | ................... | G01R 31/3278 |
| | | | | | 324/418 |
| 6,608,486 | B1 * | 8/2003 | Betts | ...................... | G01R 31/50 |
| | | | | | 324/503 |
| 6,724,193 | B2 * | 4/2004 | Lutz | ................... | G01R 31/3278 |
| | | | | | 324/418 |
| 7,605,594 | B2 * | 10/2009 | Blades | ................... | G01R 31/58 |
| | | | | | 324/750.01 |
| 9,043,073 | B2 * | 5/2015 | Ricci | ..................... | G06F 11/079 |
| | | | | | 340/439 |
| 9,055,022 | B2 * | 6/2015 | Ricci | ..................... | G06F 3/0484 |
| 10,034,066 | B2 * | 7/2018 | Tran | ....................... | A61B 5/332 |
| 10,046,229 | B2 * | 8/2018 | Tran | ..................... | A61B 5/6804 |
| 10,060,981 | B2 * | 8/2018 | Barden | ................. | G01R 31/54 |
| 10,964,130 | B1 * | 3/2021 | Dixit | .................. | G05B 23/0283 |
| 11,474,162 | B2 * | 10/2022 | Magno | ................... | G01R 19/15 |
| 2014/0266287 | A1 * | 9/2014 | Reeder, III | .......... | G01R 1/0408 |
| | | | | | 324/538 |
| 2018/0364311 | A1 * | 12/2018 | De Breucker | ....... | G01R 31/396 |
| 2021/0247463 | A1 | 8/2021 | Shier | | |

FOREIGN PATENT DOCUMENTS

| | | | | | | |
|---|---|---|---|---|---|---|
| CN | 219224857 U | * | 6/2023 | | | |
| KR | 20210133091 A | * | 11/2021 | ............ | G01R 31/54 |
| WO | WO-2020055667 A2 | * | 3/2020 | ............ | H02G 15/08 |
| WO | 2025194084 | | 9/2025 | | |

OTHER PUBLICATIONS

"Alamy Limited: Electrician equipment on grey background, top view Stock Photo—Alamy," Anonymous, Oct. 12, 2019 (Oct. 12, 2019), pp. 1-4, XP093283523, Retrieved from the Internet: URL: https://www.alamy.com/electrician-equipment-on-grey-backgroundtop-view-image361935745.html.

"American Electrician: Comparing The Best Tool Backpacks Ever Made,"—The Veto Pro Pac Tech Pac vs The Tech Pac Mei, Nov. 29, 2023 (Nov. 29, 2023), XP093283682, retrieved from the Internet: URL:https://www.youtube.com/watch?v=_pNI_I THOWw [retrieved on Jun. 4, 2025].

"DIT-MCO HT-128 User manual," DIT-MCO HT-128 and HT-128 B User manual, DITMCO International, (81 pages).

"Foreman Jonb: Basic electrical tools," Jan. 22, 2016 (Jan. 22, 2016), XP093283685, retrieved from the Internet: URL:https://www. youtube.com/watch?v=NShe_FnTFE [retrieved on Jun. 4, 2025].

"International Search Report and Written Opinion," for PCT Patent Application No. PCT/US2025/020013 mailed Aug. 7, 2025 (21 pages).

"International Search Report and Written Opinion," for PCT Patent Application No. PCT/US2025/020013 mailed Oct. 28, 2025 (21 pages).

* cited by examiner

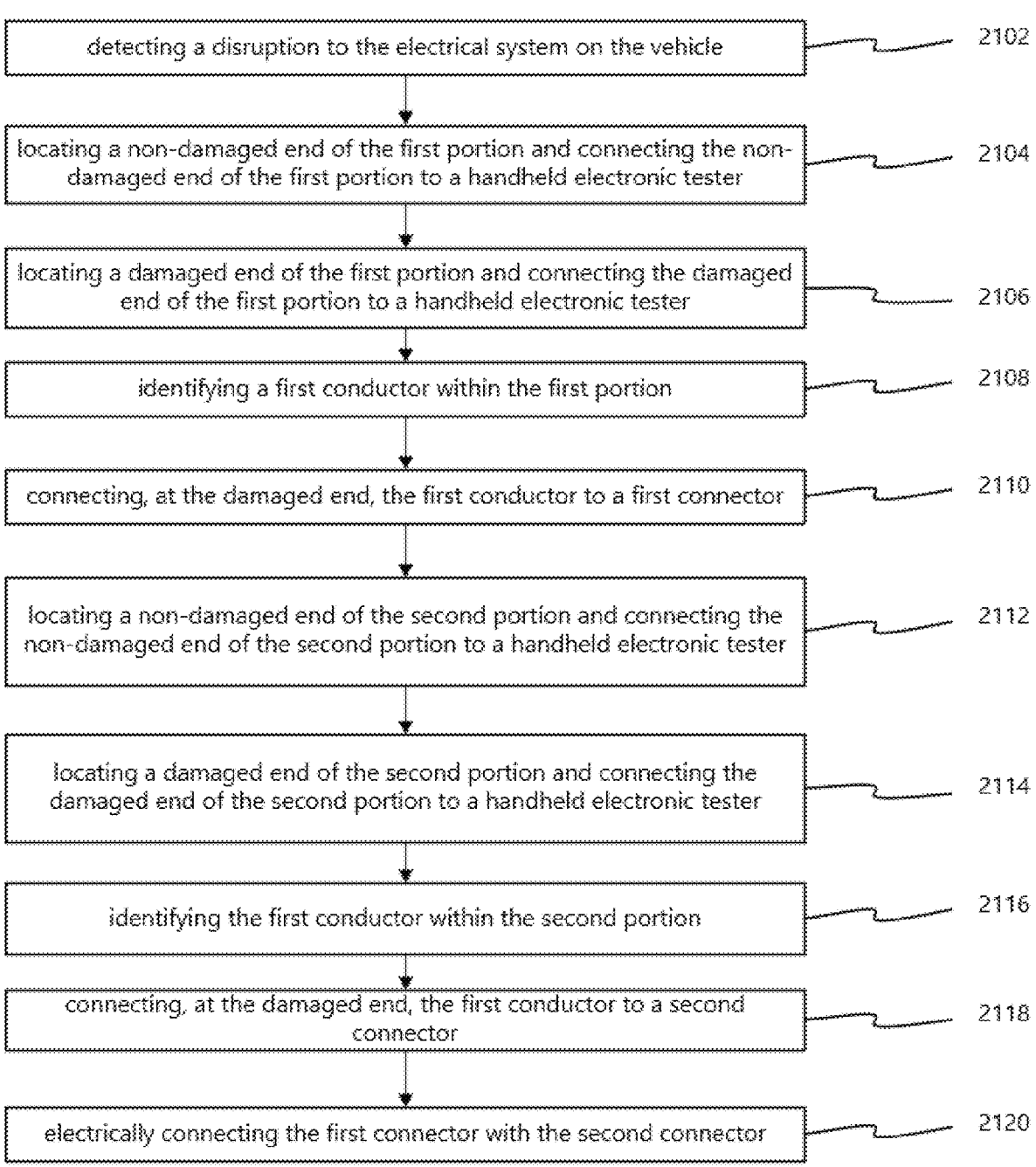

detecting a disruption to the electrical system on the vehicle — 2102 locating a non-damaged end of the first portion and connecting the non-damaged end of the first portion to a handheld electronic tester — 2104 locating a damaged end of the first portion and connecting the damaged end of the first portion to a handheld electronic tester — 2106 identifying a first conductor within the first portion — 2108 connecting, at the damaged end, the first conductor to a first connector — 2110 locating a non-damaged end of the second portion and connecting the non-damaged end of the second portion to a handheld electronic tester — 2112 locating a damaged end of the second portion and connecting the damaged end of the second portion to a handheld electronic tester — 2114 identifying the first conductor within the second portion — 2116 connecting, at the damaged end, the first conductor to a second connector — 2118 electrically connecting the first connector with the second connector — 2120

FIG. 21

SYSTEMS AND METHODS FOR EMERGENCY ELECTRICAL SYSTEMS REPAIR

CLAIMS OF PRIORITY

This application claims the benefit of U.S. Provisional Application No. 63/565,732, filed Mar. 15, 2024, the content of which is herein incorporated by reference in its entirety.

FIELD

Embodiments herein relate to methods and systems for repairing damaged electrical systems.

SUMMARY

In various embodiments, the systems and methods disclosed herein can bring critical equipment and processes back to operational status as fast as possible after being damaged. In some embodiments, the systems and methods can include quickly identifying and prioritizing specific damaged conductors, such as wires or cables (i.e. bundles) associated with critical systems within the vehicle. In some embodiments, the systems and methods can include identifying which pairs of conductors to reconnect. In some embodiments, the systems and methods can include repairing the prioritized conductors. In some embodiments, the systems and methods can include testing the repaired conductors to a critical system to ensure that the wire or cable has been repaired.

Various embodiments provide an emergency repair system for repairing damaged electrical systems. The system can include a case defining an interior volume, a first container, a first handheld electronic tester, a second handheld electronic tester, a plurality of electrical extension cables, wherein each electrical extension cable includes a plurality of conductors, wherein the plurality of electrical extension cables includes electrical extension cables of different lengths, and a plurality of connectors, wherein each of the connectors is configured to connect to the end of a conductor and to another connector, wherein the first container, the first handheld electronic tester, the second handheld electronic tester, the plurality of electrical extension cables, and the plurality of wire connectors are disposed within the interior volume.

In various embodiments, the system can further include a first crimper, wherein the first crimper is disposed within the interior volume.

In various embodiments, the first handheld electronic tester, the second handheld electronic tester, the first crimper, and at least a portion of the connectors are disposed within the first container.

In various embodiments, at least a portion of the plurality of electrical extension cables are disposed within the first container.

In various embodiments, the system can further include a first wire stripper, wherein the first wire stripper is disposed within the interior volume.

In various embodiments, the system can further include a first knife, wherein the first knife is disposed within the interior volume.

In various embodiments, the system can further include a priority guide disposed within the interior volume, wherein the priority guide defines a hierarchy of electrical systems on the vehicle.

In various embodiments, the plurality of conductors of an electrical extension cable includes wires of at least two different gauges of wire.

In various embodiments, the plurality of conductors of an electrical extension cable includes one or more wires in the range of 20 gauge to 26 gauge, one or more wires in the range of 12 gauge to 20 gauge, and one or more wires of 12 gauge or less gauge.

In various embodiments, the plurality of conductors of an electrical extension cable includes more wires of 20 gauge to 26 gauge than from 12 gauge to 18 gauge.

In various embodiments, the plurality of conductors of an electrical extension cable includes more wires of 12 gauge to 18 gauge than less than 12 gauge.

In various embodiments, the plurality of conductors of an electrical extension cable includes at least 100 wires.

In various embodiments, the plurality of conductors of an electrical extension cable includes at least 2 wires and not more than 128 wires.

In various embodiments, the plurality of electrical extension cables includes at least 50 feet of electrical extension cable in aggregate.

In various embodiments, the plurality of electrical extension cables are configured to be able to be connected to each other in a daisy chain configuration.

In various embodiments, the plurality of conductors of an electrical extension cable are each labeled or connected to a known location in a connector.

In various embodiments, the plurality of electrical extension cables includes at least one cable that is at least 2 feet long and not more than 6 feet long, and at least one cable that is at least 9 feet long and not more than 20 feet long.

In various embodiments, the plurality of electrical extension cables includes at least one cable that is about 3 feet long, at least one cable that is about 6 feet long, at least one cable that is about 9 feet long, at least one cable that is about 12 feet long, and at least one cable that that is about 15 feet long.

In various embodiments, the case is at least 24 inches long, at least 24 inches wide, and at least 12 inches tall.

In various embodiments, the case is no more than 60 inches long, no more than 60 inches wide, and no more than 36 inches tall.

In various embodiments, the case is waterproof, such that water cannot enter the interior volume when the case is securely closed.

In various embodiments, the first container is a backpack can include at least two shoulder straps and a zipper providing access to an interior volume.

In various embodiments, each of the electrical extension cables of the plurality of electrical extension cables is of the same construction, such that each of the electrical extension cables includes the same type of and number of conductors disposed within.

Various embodiments provide a method for repairing an electrical system on a vehicle. The method can include detecting a disruption to the electrical system on the vehicle, wherein a first cable is separated into a first portion and a second portion, locating a non-damaged end of the first portion and connecting the non-damaged end of the first portion to a first handheld electronic tester, locating a damaged end of the first portion and connecting the damaged end of the first portion to a second handheld electronic tester, identifying, at the damaged end, a first conductor within the first portion by sending a signal from one of the handheld electronic testers to the other handheld electronic testers through the first conductor, connecting, at the damaged end, the first conductor to a first connector, locating a non-damaged end of the second portion and connecting the non-damaged end of the second portion to one of the first handheld electronic tester or the second handheld electronic tester, locating a damaged end of the second portion and connecting the damaged end of the second portion to either the first handheld electronic tester or the second handheld electronic tester, whichever one is not connected to the non-damaged end of the second portion, identifying, at the damaged end, the first conductor within the second portion by sending a signal from one of the first or second handheld electronic testers to the other of the first or second handheld electronic testers through the first conductor, connecting, at the damaged end, the first conductor to a second connector, and electrically connecting the first connector with the second connector.

In various embodiments, the method can include: testing to ensure the non-damaged end of the first portion of the first conductor is in electrical communication with the non-damaged end of the second portion of the first conductor.

In various embodiments, wherein electrically connecting the first connector with the second connector includes connecting a first end of an electrical extension cable with the first connector and a second end of the electrical cable with the second connector.

In various embodiments, the electrical extension cable is one of a plurality of electrical extension cables in an emergency repair kit before the disruption is detected.

In various embodiments, the first handheld electronic tester and the second handheld electronic tester are in the emergency repair kit before the disruption is detected.

In various embodiments, wherein electrically connecting the first connector with the second connector includes directly connecting the first connector with the second connector.

In various embodiments, the method can include: labeling the first conductor of the first portion, once identified, prior to connecting the first conductor of the first portion to the first connector, and labeling the first conductor of the second portion, once identified, prior to connecting the first conductor of the second portion to the second connector.

In various embodiments, the first portion of the first cable is electrically separated from the second portion of the first cable as a result of the disruption to the electrical system.

In various embodiments, the first conductor is one of a plurality of conductors within the first cable.

In various embodiments, the first handheld electronic tester and the second handheld electronic tester are similarly built, such that the two can be interchanged for each other.

Various embodiments provide a method for repairing an electrical system on a vehicle. The method can include detecting a disruption to the electrical system on the vehicle, wherein a first cable is separated into a first portion and a second portion, locating a non-damaged end of the first portion and connecting the non-damaged end of the first portion to a first handheld electronic tester, locating a damaged end of the first portion and connecting the damaged end of the first portion to a second handheld electronic tester, identifying, at the damaged end, a first conductor within the first portion by sending a signal from one of the handheld electronic testers to the other handheld electronic testers through the first conductor, connecting, at the damaged end, the first conductor to a first connector, locating a non-damaged end of the second portion and connecting the non-damaged end of the second portion to a third handheld electronic tester, locating a damaged end of the second portion and connecting the damaged end of the second portion to a fourth handheld electronic tester, identifying, at the damaged end, the first conductor within the second portion by sending a signal from one of the third or fourth handheld electronic testers to the other of the third or fourth handheld electronic testers through the first conductor, connecting, at the damaged end, the first conductor to a second connector, and electrically connecting the first connector with the second connector.

In various embodiments, the method can further include: testing to ensure the non-damaged end of the first portion of the first conductor is in electrical communication with the non-damaged end of the second portion of the first conductor.

In various embodiments, electrically connecting the first connector with the second connector includes connecting a first end of an electrical extension cable with the first connector and a second end of the electrical cable with the second connector.

In various embodiments, the electrical extension cable is one of a plurality of electrical extension cables in an emergency repair kit before the disruption is detected.

In various embodiments, the first handheld electronic tester, the second handheld electronic tester, the third handheld electronic tester, and the fourth handheld electronic tester are in the emergency repair kit before the disruption is detected.

In various embodiments, electrically connecting the first connector with the second connector includes directly connecting the first connector with the second connector.

In various embodiments, the method can further include: labeling the first conductor of the first portion, once identified, prior to connecting the first conductor of the first portion to the first connector, and labeling the first conductor of the second portion, once identified, prior to connecting the first conductor of the second portion to the second connector.

In various embodiments, the first portion of the first cable is electrically separated from the second portion of the first cable as a result of the disruption to the electrical system.

In various embodiments, the first conductor is one of a plurality of conductors within the first cable.

In various embodiments, the first handheld electronic tester and the second handheld electronic tester are similarly built, such that the two can be interchanged for each other.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 21 is a flowchart of a method for repairing an electrical system on a vehicle in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Electrical systems are present on various vehicles, such as ships and aircraft. The electrical systems can include cables including conductors or bundles of wires that electrically couple various portions of the electrical systems. The cables can transmit power signals, control signals, and other signals between different locations within the vehicle. The transmission of these electrical signals can be required for different systems to operate correctly.

In various different situations, these electrical systems can become damaged. As an example, a ship can be attacked or have an accidental explosion that damages various electrical systems on the ship. In many instances, there are different tiers of priority for the order in which the systems should be repaired. As an example, various electrical systems can be required to resolve the emergency situation resulting from an explosion, such as an electrical system that controls and powers a pump, such an electrical system can be prioritized over a system that controls a microwave or cooking equipment.

The various methods and systems disclosed herein can provide the ability to quickly repair damaged electrical systems in an efficient manner.

Figure 1:
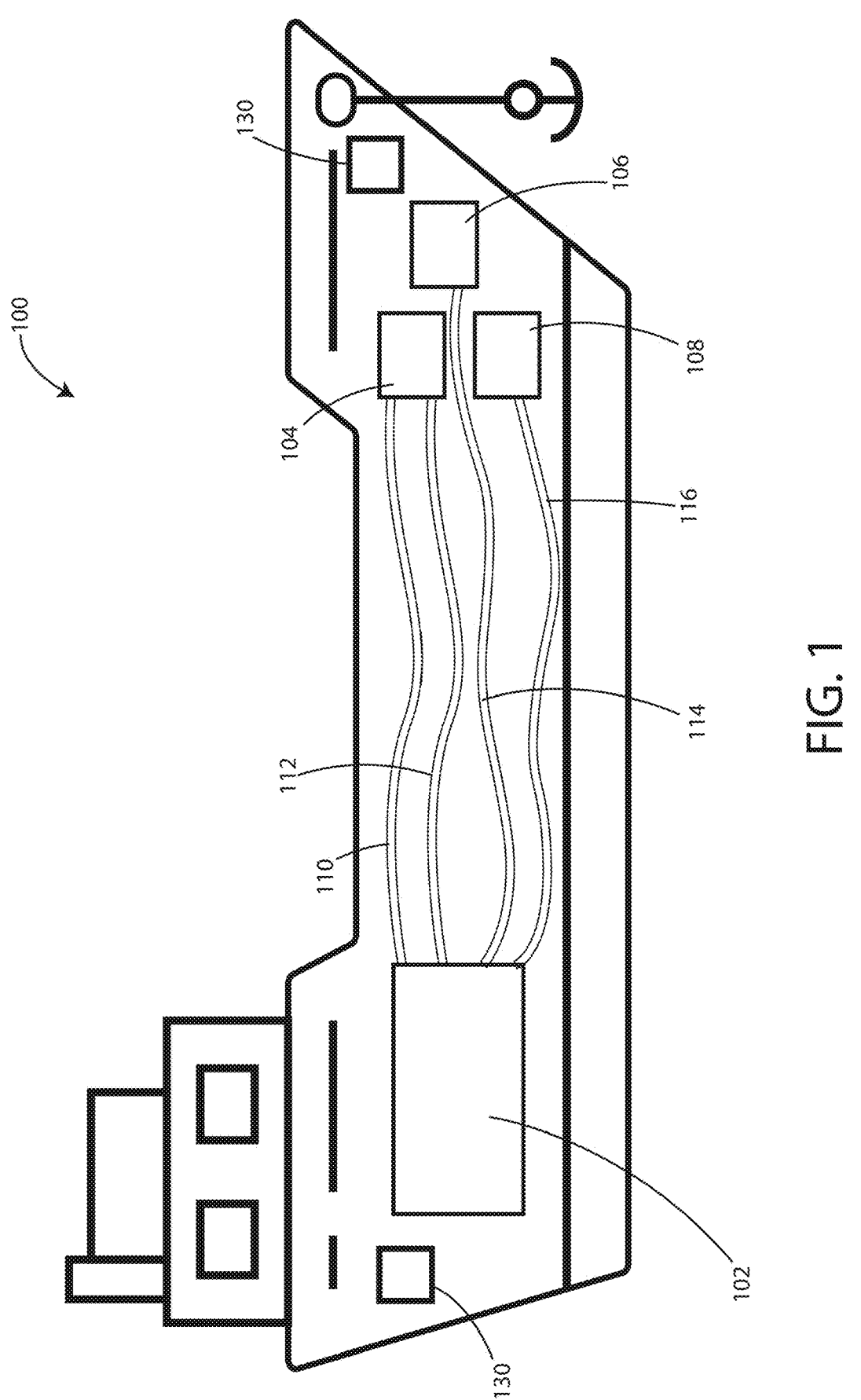
FIG. 1 is a schematic view of a vehicle in accordance with various embodiments herein.

FIG. 1 shows a vehicle in the form of a ship 100 in accordance with various embodiments. While the figures show an embodiment of a ship 100, it should be understood that the systems and methods described herein could also apply to other vehicles, such as aircraft, tracked vehicles, or wheeled vehicles.

A vehicle, such as ship 100, can include a primary system 102 and one or more secondary systems 104, 106, 108. The ship 100 can include a plurality of cables or wire bundles 110, 112, 114, 116 extending from one area to another. The cables or wire bundles 110, 112, 114, 116 can electrically connect systems 102 one in area, such as power or control systems, with systems 104, 106, 108 in a second area, such as HVAC systems, driving systems, weapon systems, radar systems, or pump systems. Each cable can include a plurality of conductors, such as in the form of wires. Each of the conductors can transmit a signal, such as a control signal or a power signal, to between portions of the system.

In various embodiments, a vehicle can include an emergency repair kit 130 disposed within the vehicle. The emergency repair kit 130 can include tools, extension cables and other various components to repair a damaged electrical system. The emergency repair kit 130 will be described below. In some embodiments, multiple emergency repair kit systems can be disposed on a vehicle, such as shown in FIG. 1. In some embodiments, the kit/system 130 can be disposed at different location on the vehicle, such as one in the bow and one in the stern. In some embodiments, a vehicle can include two, three, four, five, six, seven, eight, nine, ten, or more kits 130 within or on the vehicle.

In various embodiments, the cables 110, 112, 114, 116 can become disrupted or damaged, such as from an attack. The damage can sever, cut, or split the cables 110, 112, 114, 116, and as a result electrical communication between different systems, such as a primary system and a secondary system, can be disrupted. The damage to the cables can result in the electrical communication between systems 102, 104, 106, 108 terminating.

Figure 2:
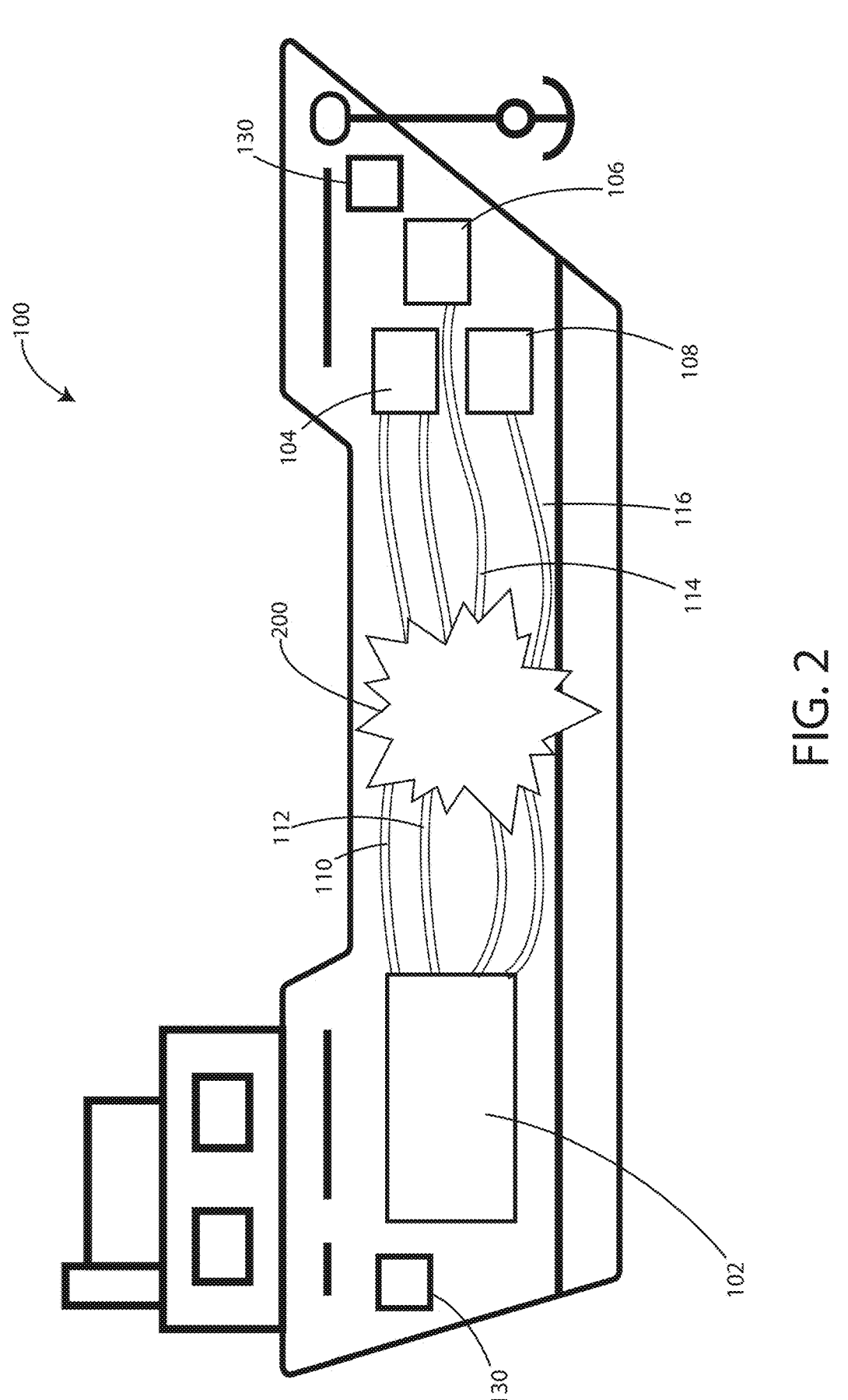
FIG. 2 is a schematic of the ship in FIG. 1 after an explosion in accordance with various embodiments herein.
Figure 3:
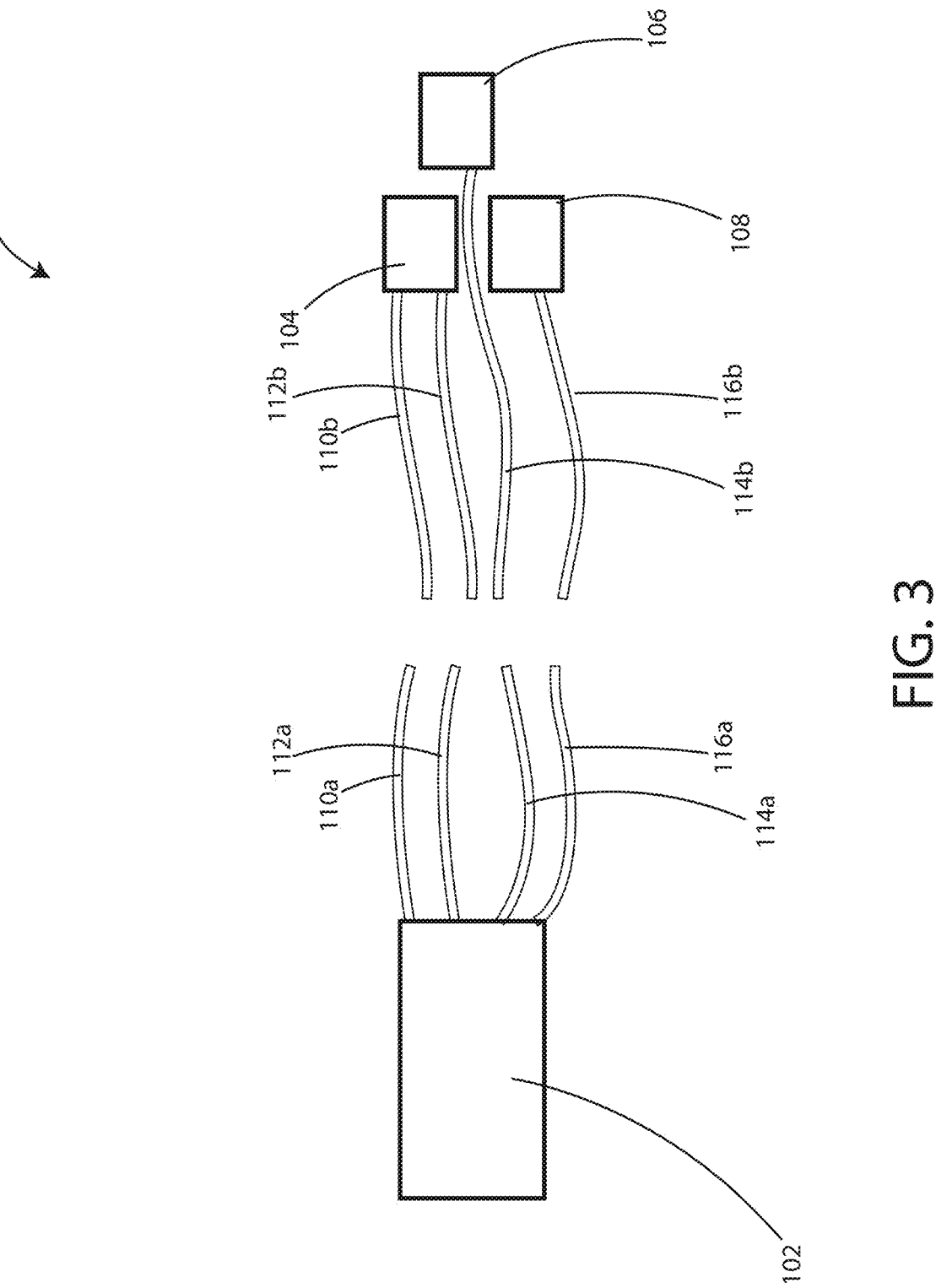
FIG. 3 is a schematic of a damaged electrical systems in accordance with various embodiments herein.

FIG. 2 shows a schematic of the ship 100 experiencing a disruption, such as a result of being attacked or of an accident. The explosion 200 results in damage to the cables 110, 112, 114, 116 as shown in FIG. 3. As shown in FIG. 3, the cables 110, 112, 114, 116 have discontinuities or separations resulting in the inability for system 102 to communicate with systems 104, 106, 108. The separations in the bundles 110, 112, 114, 116 results in each bundle 110, 112, 114, 116 having a first portion 110*a*, 112*a*, 114*a*, 116*a* and a second portion 110*b*, 112*b*, 114*b*, 116*b*. With electrical communications between the first portions 110*a*, 112*a*, 114*a*, 116*a* and the second portions 110*b*, 112*b*, 114*b*, 116*b* terminating.

The personnel of the vehicle will need to determine which cables need to be repaired first. The cables can be tiered based on priority for repair. In some embodiments, cables can be color coded based on priority or have other indications for their priority tier. In other embodiments, schematics, such as a priority guide, can be referenced to determine the priority tiers. Systems that are needed immediately can be repaired first while systems that are not critical to the operation of the vehicle can be ignored or left damaged until higher priority systems have been repaired.

Figure 4:
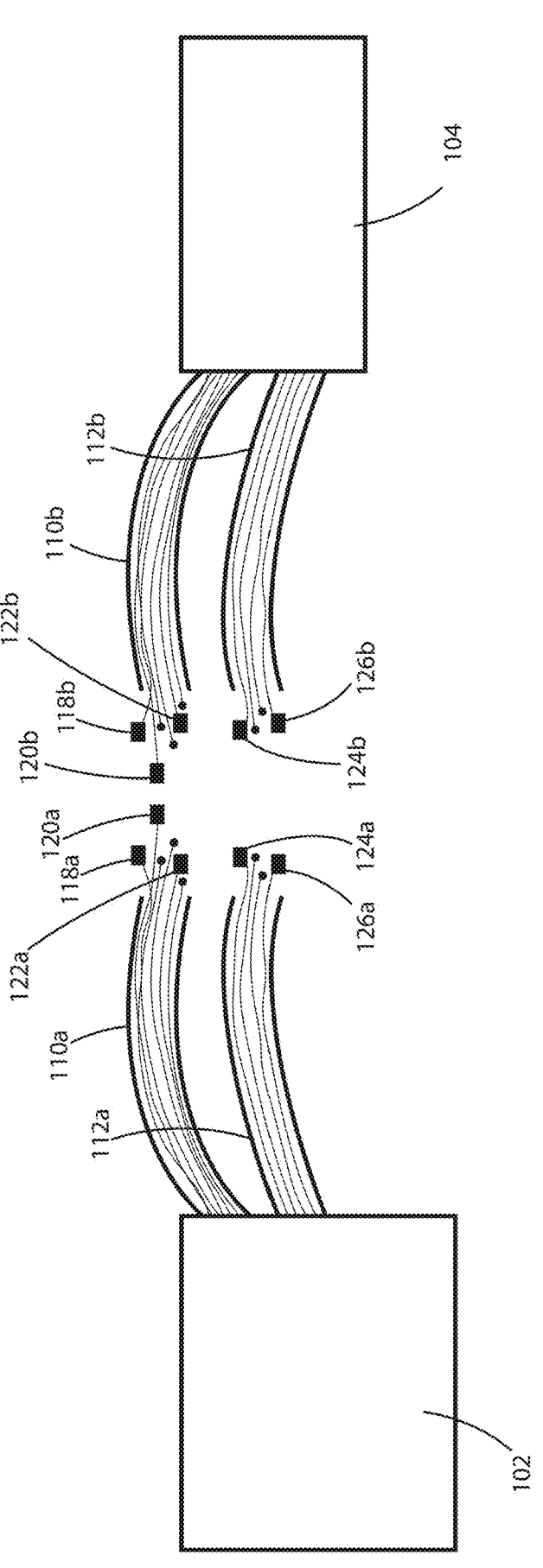
FIG. 4 is a schematic of the damaged electrical system being repaired in accordance with various embodiments herein.

In the example shown in the figures, it has been identified that system 104 is of high priority and needs to be repaired first. Cables 110 and 112 are required for the system 102 to communicate with system 104. As such, cables (i.e., wire bundles) 110 and 112 can be repaired first and the other bundles can be ignored, such as shown in FIG. 4.

Once the personnel know which cables they need to repair, such as by referencing a priority guide or being instructed by a commanding officer, the personnel needs to physically identify the cables that need to be repaired. In various embodiments, the personnel can use handheld electronic testing devices, such as a DIT-MCO HT-128 Handheld Wiring Analyzer programmed specifically for ease of use in triage and repair situations, to identify each cable, such as to determine which cable is cable 110 and which one is cable 112. In many scenarios, it will not be visually possible to tell cable 110 from the other cables 110, 112, 114, 116.

Each cable or wire bundle can include a plurality of conductors or wires. Each conductor can transmit a signal to or from the system 102 to the system 104. Similar to the cables, the conductors within a cable can be prioritized for repair. In some cases, once a conductor has been identified it can be prepared for repair, such as by being connected with a connector. As shown in FIG. 4, the damaged ends conductors 118a, 120a, 122a, 124a, 126a have been identified and labeled, whereas other conductors have been left unidentified. In some embodiments, all conductors can be identified and repair, whereas in other embodiments, only conductors of more importance are initially repaired (as shown in FIG. 4).

The process for identifying cables as well as conductors within the cables can be repeated for the damaged ends of cables 110b, 112b and wires 118b, 120b, 122b, 124b, 126b. The process of identifying the second damaged ends can take place before or after the identification of the first damaged ends, or it can take place simultaneously, such as if there are two groups of personnel working on the repair (i.e. one group on each side of the disruption). The ends of conductors that are of lower priority and are not currently being repaired can be capped or otherwise safely isolated.

Figure 5:
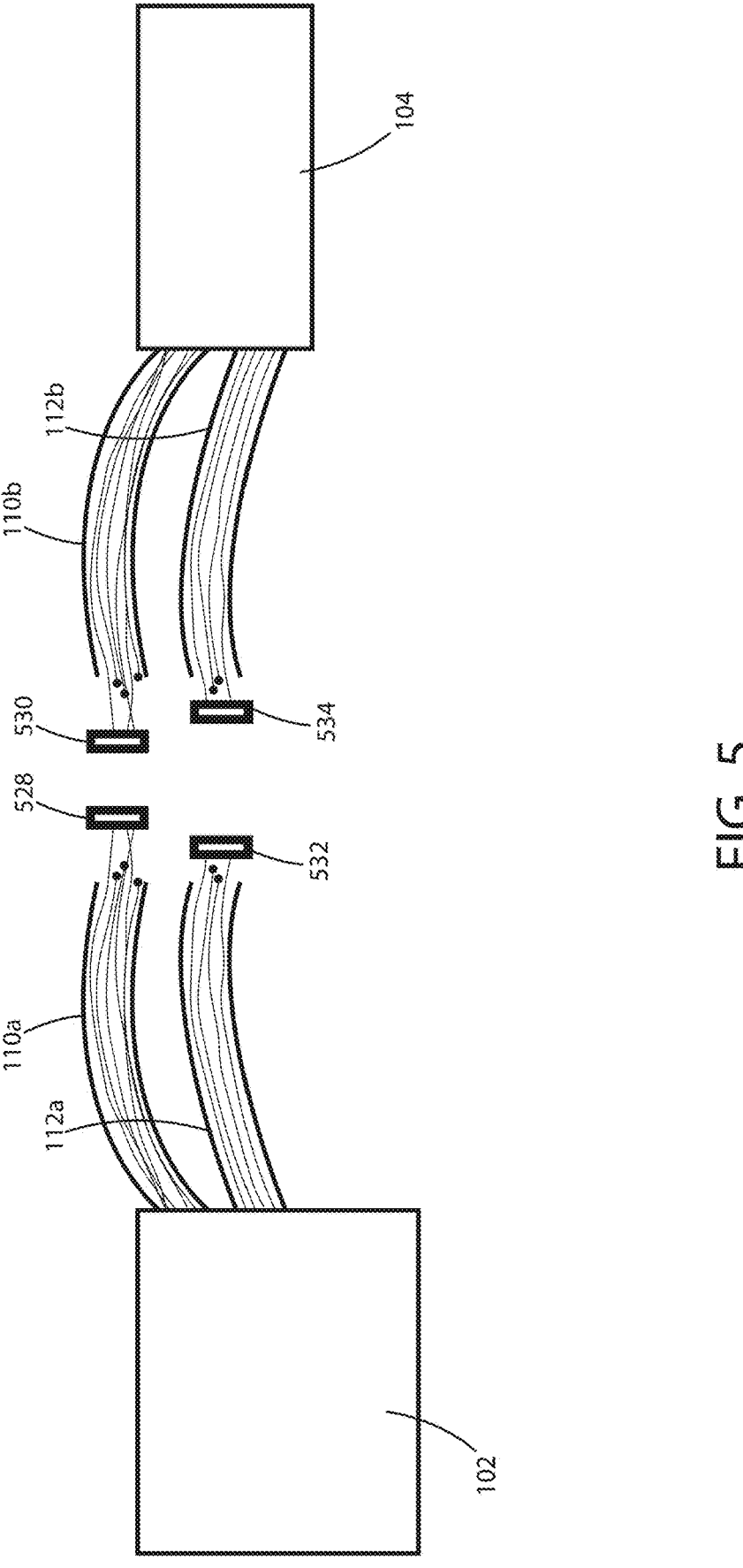
FIG. 5 is a schematic of the damaged electrical system being repaired in accordance with various embodiments herein.

FIG. 5 shows the damaged ends of conductors 118a, 120a, 122a being connected into known locations within connector 528. Similarly, the damaged ends of conductors 118b, 120b, 122b have been connected into known locations within connector 530. The second cable 112 can be similarly repaired by connecting damaged ends 124a, 126a into connector 532 and damaged ends 124b, 126b into connector 534.

Figure 6:
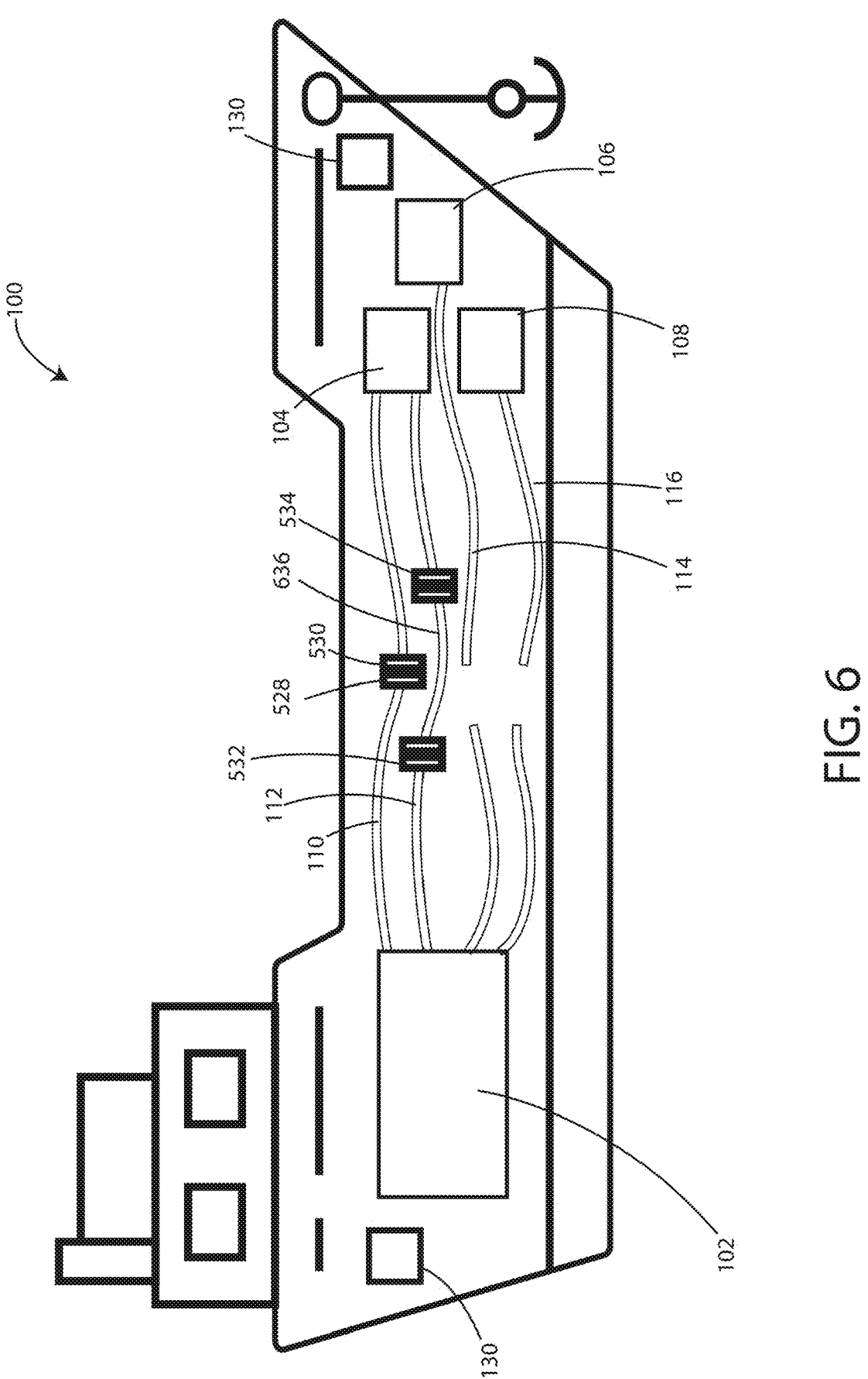
FIG. 6 is a schematic of the ship with partially repaired electrical systems in accordance with various embodiments herein.

FIG. 6 shows electrical communication has been restored between system 102 and system 104. In some embodiments, two of the connectors can be directly connected to each other to resume electrical communication through a cable, such as shown with cable 110 including connector 528 directly connected with connector 530. In some embodiments, two of the connectors can be indirectly connected to each other to resume electrical communication through a cable, such as with an extension cable 636 disposed between the two connectors 532, 534 to resume electrical communication through wire bundle 112.

Figure 7:
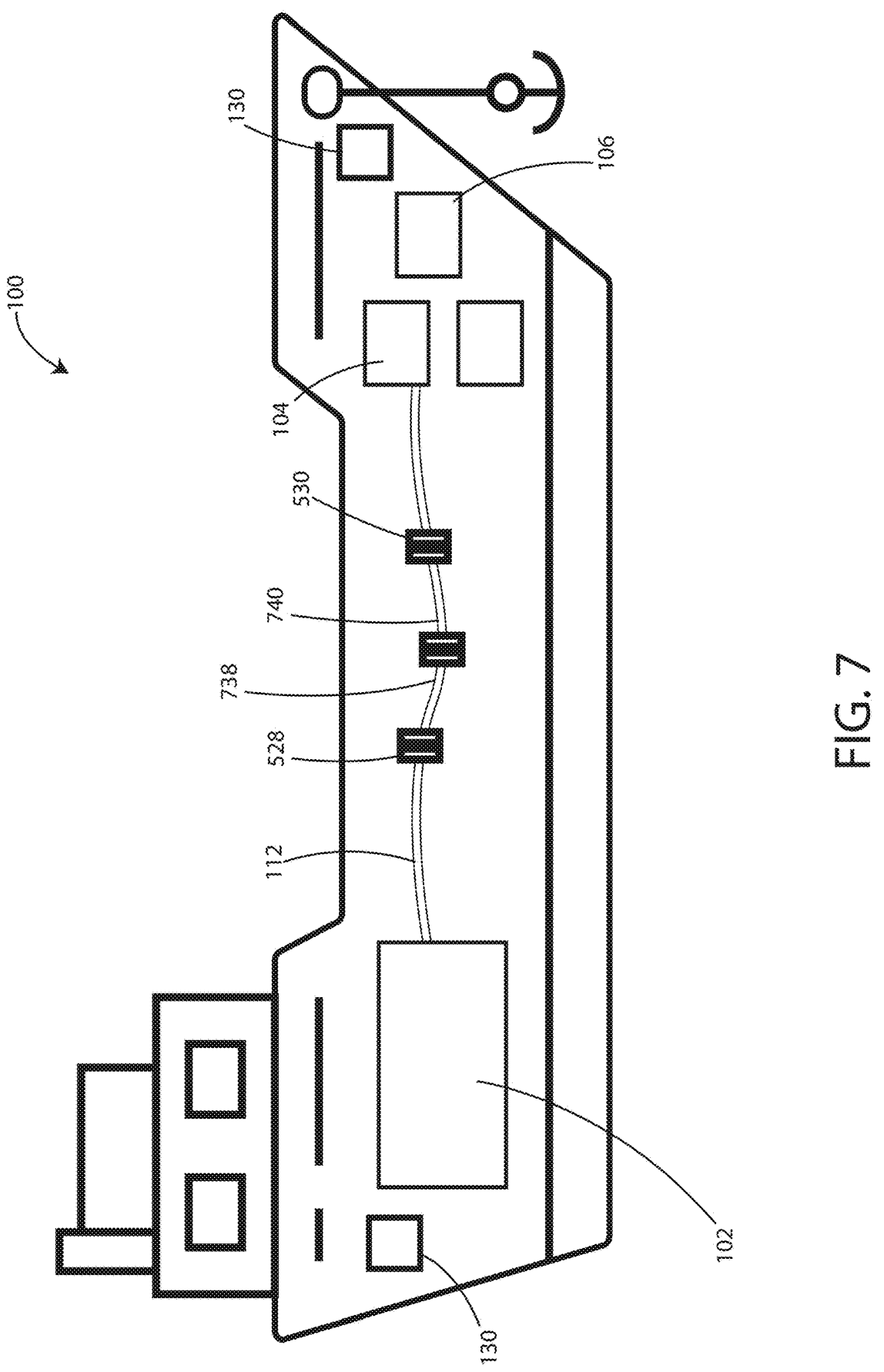
FIG. 7 is a schematic of the ship with partially repaired electrical systems in accordance with various embodiments herein.

In some embodiments, extension cables can be connected together, such as to bridge a gap between the two damaged ends of a cable that is larger than the length of one extension cable. FIG. 7 shows a first extension cable 738 being connected to a second extension cable 740 to electrically connect the first connector 528 with the second connector 530.

Figure 8:
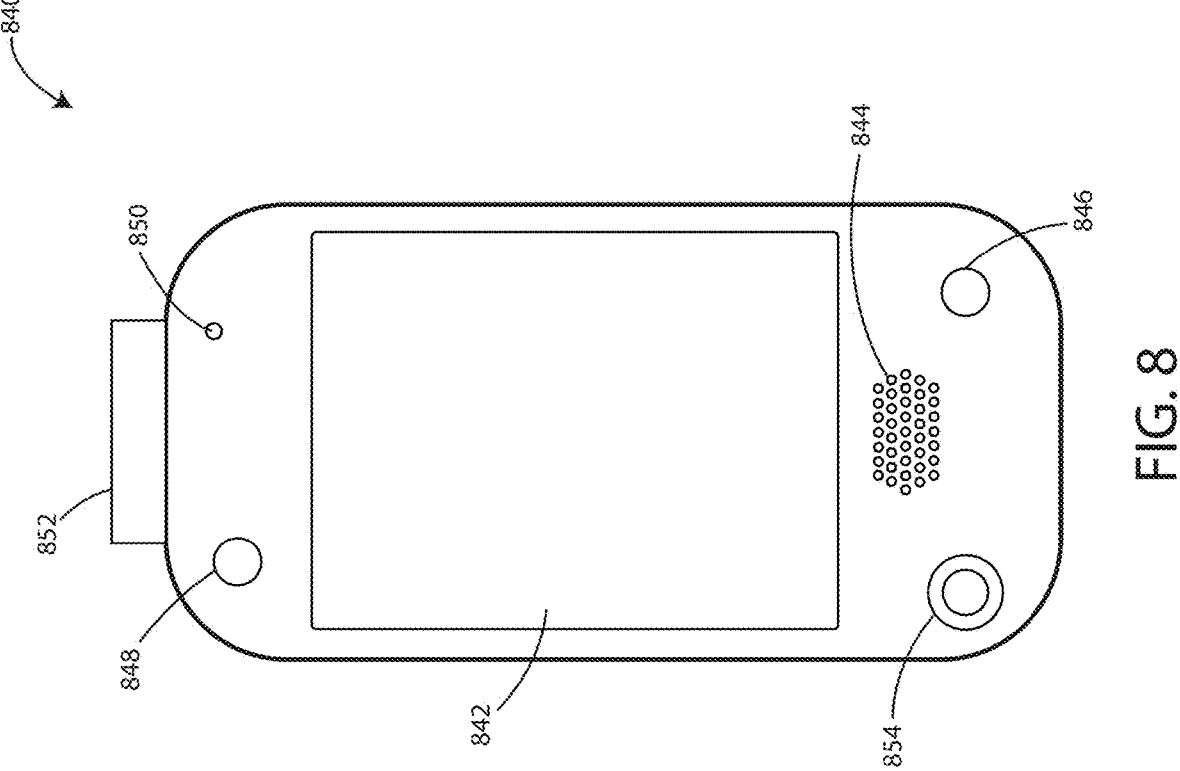
FIG. 8 is a schematic front view of an handheld electronic tester in accordance with various embodiments herein.

FIG. 8 shows a schematic front view of a handheld electronic tester 840 in accordance with various embodiments herein. In various embodiments, the system can include handheld electronic tester 840, such as a DIT-MCO HT-128 or a DIT-MCO HT-128B. The analyzer can have the capacity to connect and test multiple conductors at the same time.

The handheld electronic tester 840 can include a user interface, such as a visual user interface 842 and/or an audio user interface 844. The tester 840 can include a power button 846 for turning the device ON/OFF. The tester 840 can further include a light, such as a flashlight 848. The tester 840 can include a battery indicator 850 to inform a user of the battery life status.

The handheld electronic tester 840 can include a connection port 852. In some embodiments, the connection port 852 can be located on the back of the device. In various embodiments, the connection port 852 can be configured to connect one or more conductors to the handheld electronic tester 840. In some embodiments, the connection portion 852 can be configured to be connected to up to 128 conductors simultaneously. The electronic tester 840 can be configured to send a signal to and/or receive a signal from any one of the 128 connection points in the connection port 852.

In some embodiments, the electronic tester 840 can include a probe input 854. In some embodiments, the probe input 854 can also serve as $129^{th}$ test point. In some embodiments, the probe input 854 can be configured for banana jacks for resistance measurement and common grounding.

The handheld electronic tester 840 can be configured to communicate with another handheld electronic tester 840, such as through a wired connect. In various embodiments, a master handheld electronic tester 840 can send a signal from one of its connection pins and a slave handheld electronic tester 840 can identify which pin it receives the signal on. As an example, the master device can send a signal from a conductor that is connected to pin #35, the slave device can receive the signal at the conductor that is connected to its pin #78. As a result, both ends of the conductor can be identified as part of a common conductor. An end that is undamaged is generally located at a known location (prior to being disconnected as described below), as such the damaged end can be identified for a conductor that desired to be repaired.

Figure 9:
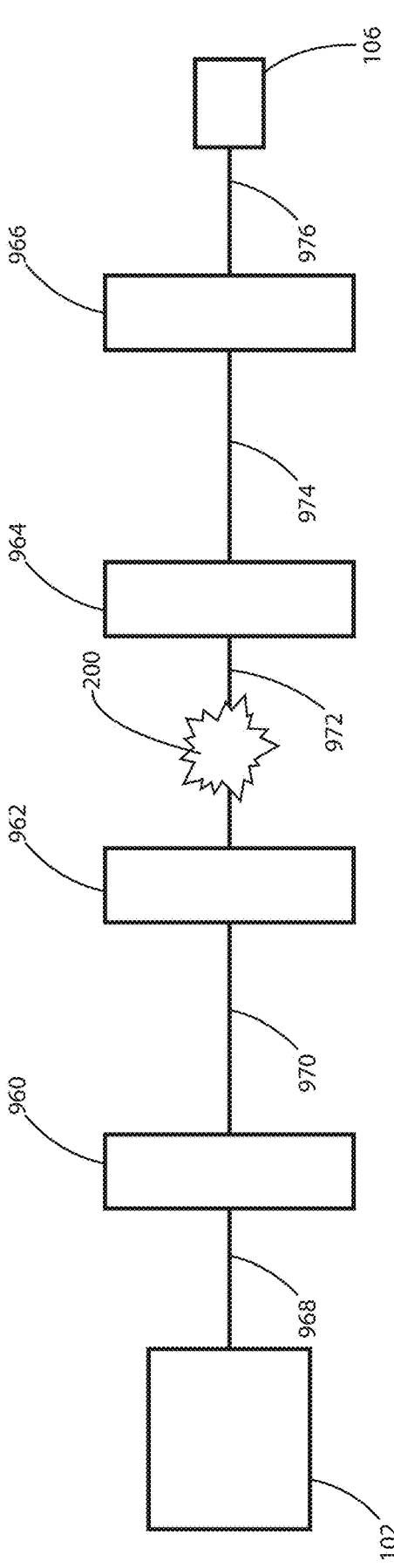
FIG. 9 is a schematic of a damaged electrical system in accordance with various embodiments herein.

FIG. 9 shows a schematic of a damaged electrical system in accordance with various embodiments herein. The electrical system of FIG. 9 includes a primary system 102 that is electrically connected to a secondary system 106 via a plurality of cables 968, 970, 972, 974, 976 and junction boxes 960, 962, 964, 966. While FIGS. 9-16 show an example of a disruption 200 to a cable 972 between two junction boxes 962, 964, it should be understood that the same description can also apply to cable directly connecting the primary system 102 with the secondary system 106, such as shown in FIG. 1.

In various embodiments, much of the wiring or cabling on a ship (or other vehicle) which travels a significant distance can be done using junction boxes when going from compartment to compartment. The disruption event 200 can sever a connection (i.e., cable 972) between two junction boxes 962, 964 as shown in FIG. 9.

In various embodiments, the disruption event 200 can sever or disrupt multiple cable, even though only a single cable 972 is shown in FIG. 9. Personnel in charge of repairing the electrical system can first identify which of the disrupted cables is the cable they are tasked with repairing. In some embodiments, the disrupted cables can have different physical appearances which can make identification of the cable possible without any testing. However, in many embodiments, the electronic tester can be connected to a cable on the undamaged end and a second electronic tester can be connected to a damaged end to determine if both testers are connected to the same cable. If they are not, the second electronic tester can be connected to a different damaged end. This process can be repeated until the damaged end of the cable has been identified.

After the correct cable is identified, the personnel can start to identify the conductors within the cable. The users can use the first electronic tester on the undamaged end of the conductors from junction box 962 and the second electronic tester on the damaged end of the conductors at the disruption 200. In various embodiments, a second set of users can use a second set of electronic testers on the second portion of the cable 972 spanning from the disruption 200 to the third junction box 964. In the embodiments with junction boxes, priority cables can be designated by the vessel authority or by the priority guide, but all conductors within a cable can be repaired (in contrast to FIGS. 4 and 5).

Figure 10:
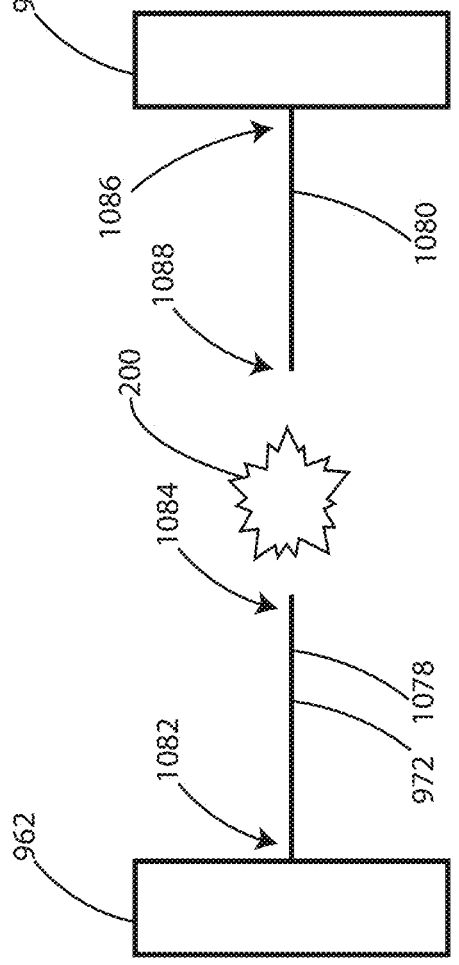
FIG. 10 is a schematic of a portion of the damaged electrical system in FIG. 9 in accordance with various embodiments herein.

FIG. 10 shows a portion of FIG. 9. Specifically, FIG. 10 shows the portion of the electrical system that is in need of repair. The second junction box 962 is intended to be connected with the third junction box 964 via cable 972. The disruption event 200 separates the cable 972 into a first portion 1078 and a second portion 1080. The first portion 1078 includes a non-damaged end 1082 that is connected to the junction box 962 and a damaged end 1084. The second portion 1080 includes a non-damaged end 1086 that is connected to the junction box 964 and a damaged end 1088.

Figure 11:
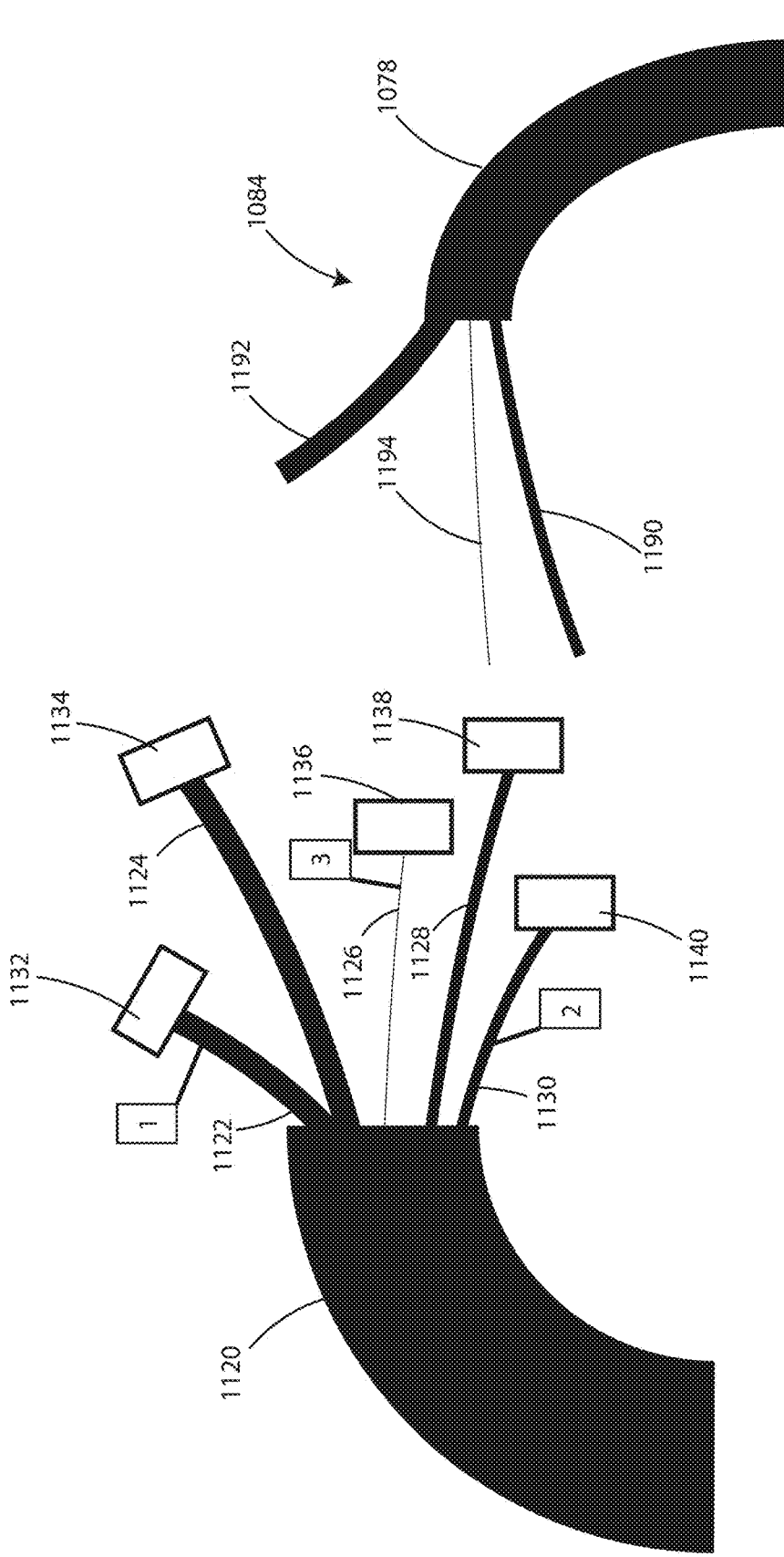
FIG. 11 is a schematic of a damaged end of a cable and an extension cable in accordance with various embodiments herein.

FIG. 11 shows an extension cable 1120 that includes a plurality of conductors 1122, 1124, 1126, 1128, 1130. The plurality of conductors can include conductors of different gauges. Each of the conductors 1122, 1124, 1126, 1128, 1130 can be coupled to a connector 1132, 1134, 1136, 1138, 1140 respectively. In other embodiments, all of the conductors can be connected to a single connector. A connector can be configured to connect with another connector to place a conductor of the extension cable 1120 with a conductor of a cable, such as cable 972. The extension cable 1120 can be connected to the first portion 1078 and the second portion 1080 to restore electrical communication between junction box 962 and junction box 964.

FIG. 11 further shows the cable 972 includes three different conductors 1190, 1192, 1194. Each of the conductors 1190, 1192, 1194 is of a different gauge. However, in other embodiments, multiple conductors or all of the conductors within a cable can be of the same gauge.

Figure 12:
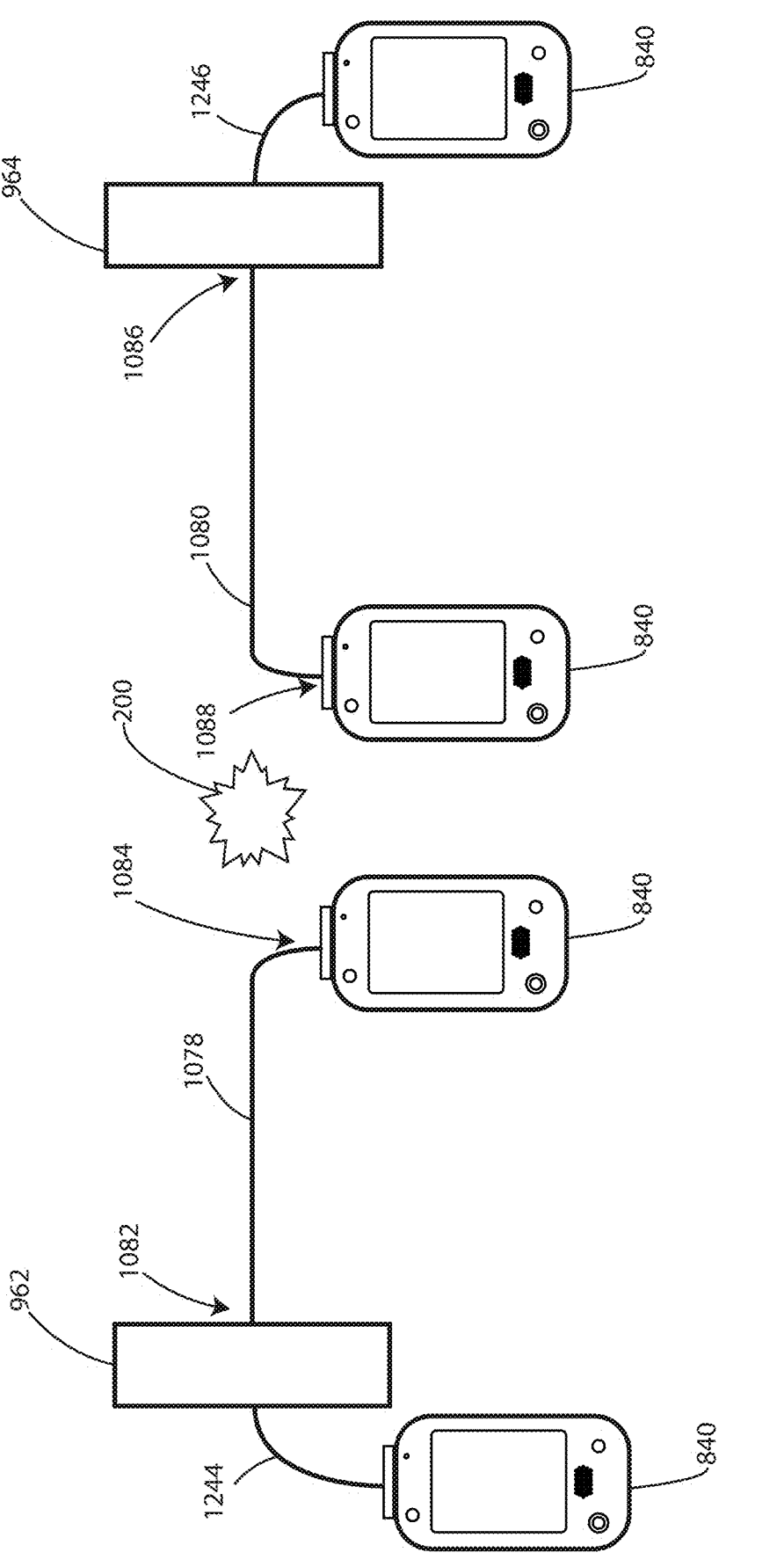
FIG. 12 is a schematic of the damaged electrical system in FIG. 10 being repaired in accordance with various embodiments herein.

In order to determine how the extension cable 1120 should be connected with the first portion 1078, the conductors within the first portion 1078 need to be identified. FIG. 12 shows a schematic of the conductors being identified in the first portion 1078 at the same time the conductors are being identified in the second portion 1080. However, it is also possible to identify the conductors in the first portion 1078 and then move onto identifying the conductors in the second portion 1080.

In various embodiments, in order to connect the electronic tester 840 to the non-damaged end of a cable, and the conductors within the cable, the electronic tester can be connected to a junction box where the non-damaged end of the cable is connected. As an example, FIG. 12 shows a cable 1244 connecting the electronic tester 840 to the junction box 962. The cable 1244 can be part of a kit 130. The cable 1244 can include a plurality of conductors, such as 128 conductors. The conductors of cable 1244 can be connected within the junction box 962 to the conductors within the non-damaged end 1082 of the first portion 1078. Connecting the electronic tester 840 to the connections within the junction box 962 can ensure that the first portion 1078 of the cable is in working condition. Further, the conductors within the first portion 1078 can be connected to known locations within the junction box 962 aiding in identifying conductors on the non-damaged end. Similarly, an electronic tester 840 can be connected to the junction box 964 via a cable 1246 to electrically connect to the non-damaged end of the second portion 1080.

In various embodiments, communication between two electronic testers 840 can require a single wire connection. A single wire connection can be accomplished by running wire (or conductor) between the two locations of the testers or by using a conductor within a cable. In various embodiments, one of the handheld testers 840 can be a master unit and the other handheld tester 840 can be a slave unit. In various embodiments, the master tester 840 can be used at the non-damaged end and the slave tester 840 can be used at the damaged end. After a single conductor has been identified between the master tester and the slave tester, the single conductor can be used for communication. In various embodiments, a single conductor can be allocated for communication, such as while identifying other conductors.

Figure 13:
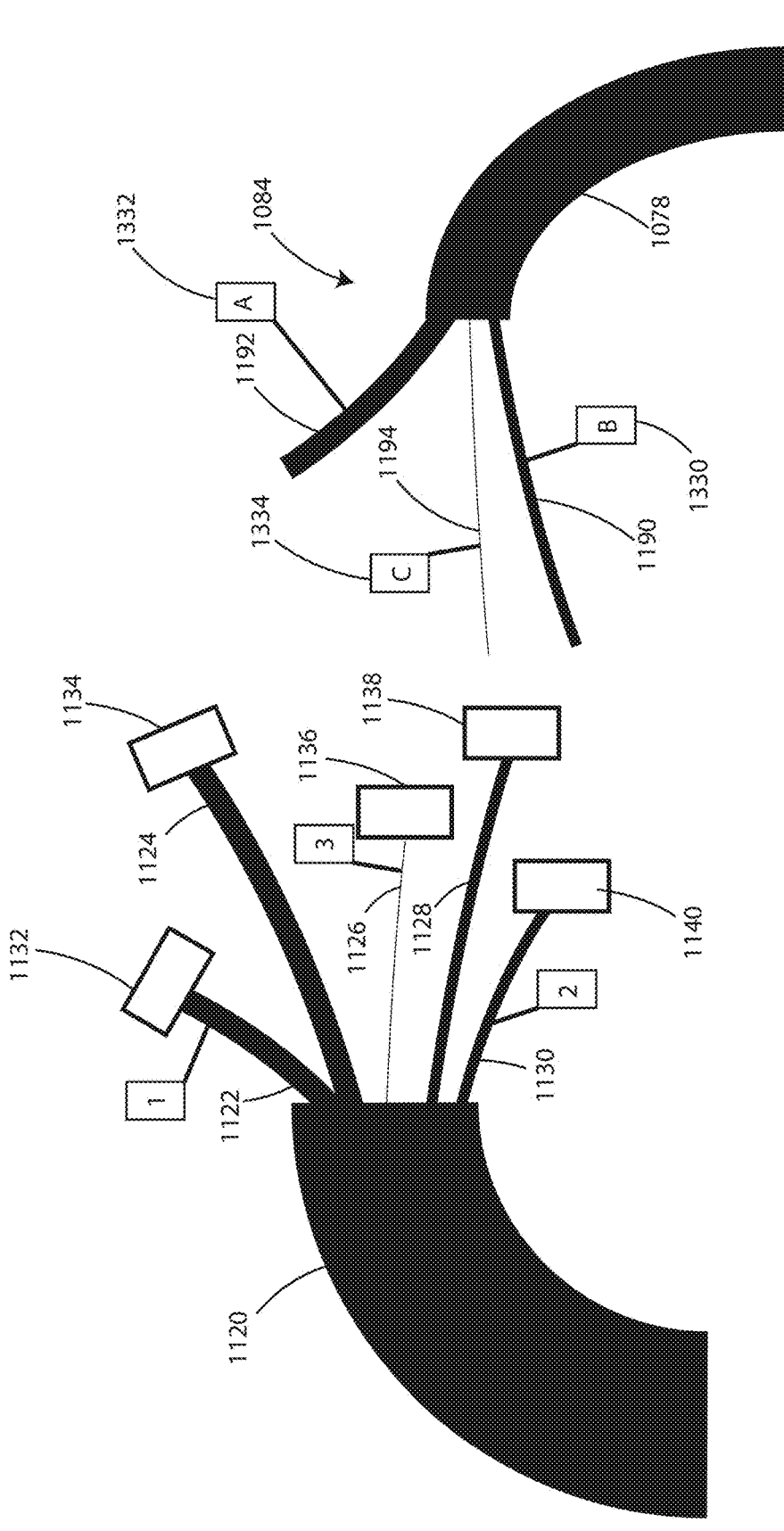
FIG. 13 is a schematic of a damaged end of a cable and an extension cable in accordance with various embodiments herein.

In various embodiments, in order to identify the conductors in a damaged cable, all of the conductors on the damaged end can be connected to the slave tester (up to 128 points or whatever the capability of the electronic tester is). The master tester can operate in one of two modes, such as a "probe mode" or an "all points mode." In the "probe mode," a technician or other personnel can connect to one point on non-damaged end, or within the junction box. The slave device can identify which of the conductors is connected to the point and the technician can label the conductor on the damaged end, such as shown in FIG. 13. This process can be repeated until all conductors have been identified.

In the "all points mode," the technician can connect to all points in the junction box (generally one junction box is used for one cable). The Master device can cycle through all of the connected points/conductors. The technician, on the damaged end, can label each conductor as shown in FIG. 13.

Figure 15:
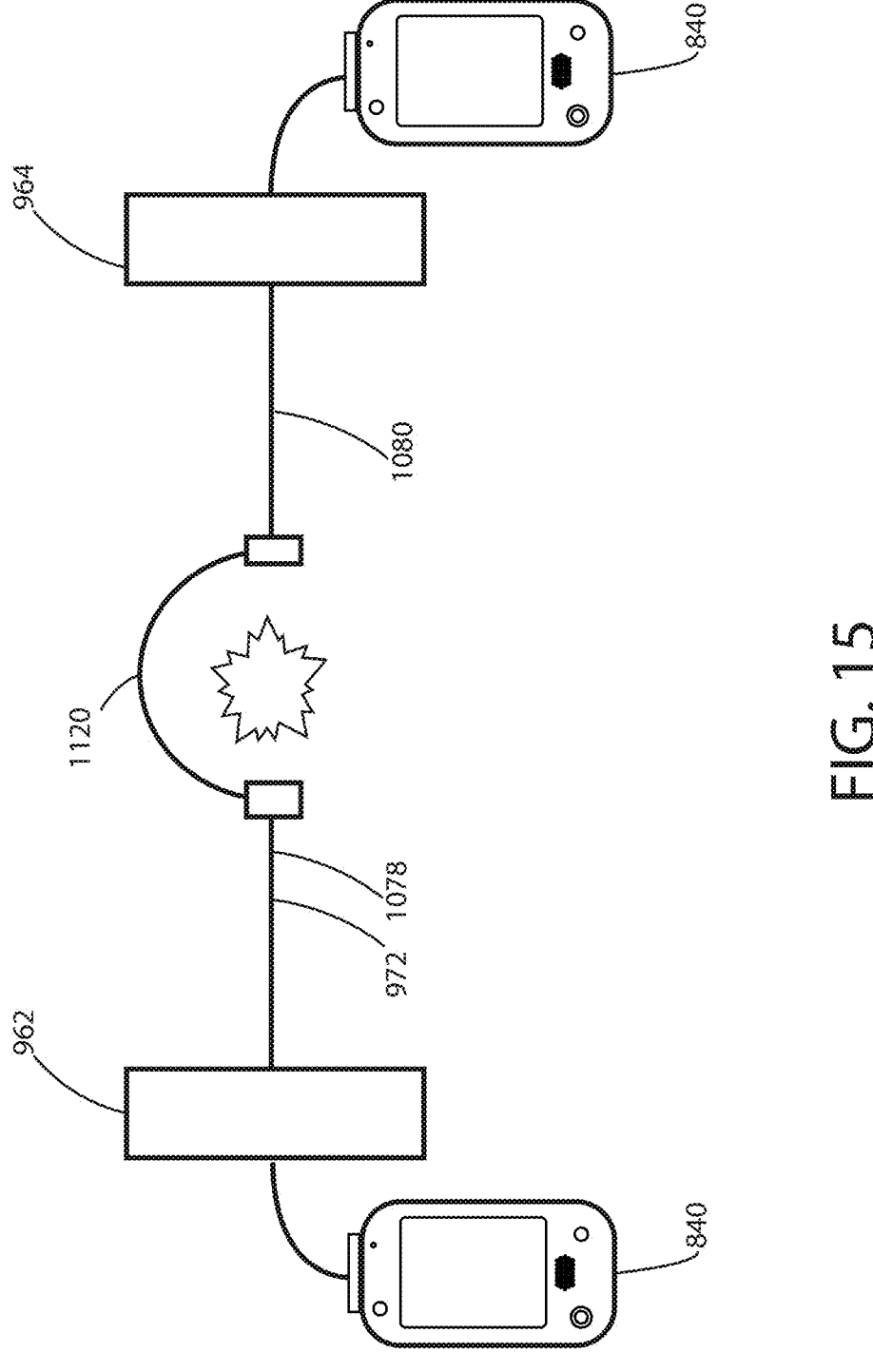
FIG. 15 is a schematic of the damaged electrical system being repaired in accordance with various embodiments herein.

After all conductors on a damaged end have been identified, connections to the slave tester device(s) can be removed. The extension cables in the repair kit systems can then be used to electrically connect the damaged ends together based upon their labels. Once the connections have been made, the two Master handhelds can be used to test the connections to ensure they have been installed correctly, such as shown in FIG. 15. One of the conductors again can be used for communication between the handheld electronic testers, and one handheld electronic tester will turn into a slave for testing purposes.

FIG. 13 shows a schematic of a damaged end 1084 of the first portion 1078 of a cable and an extension cable 1120 in accordance with various embodiments herein. As mentioned previously, each conductor 1190, 1192, 1194 of the cable can be identified and labeled. Each label 1330, 1332, 1334 can identify the conductor that it is connected to. In various embodiments, the emergency repair kit described herein can include a plurality of labels. The labels can include an adhesive or mechanical connector to attach the label to a conductor. The labels can further include an identifier, such as one or more letters and/or numbers.

Figure 14:
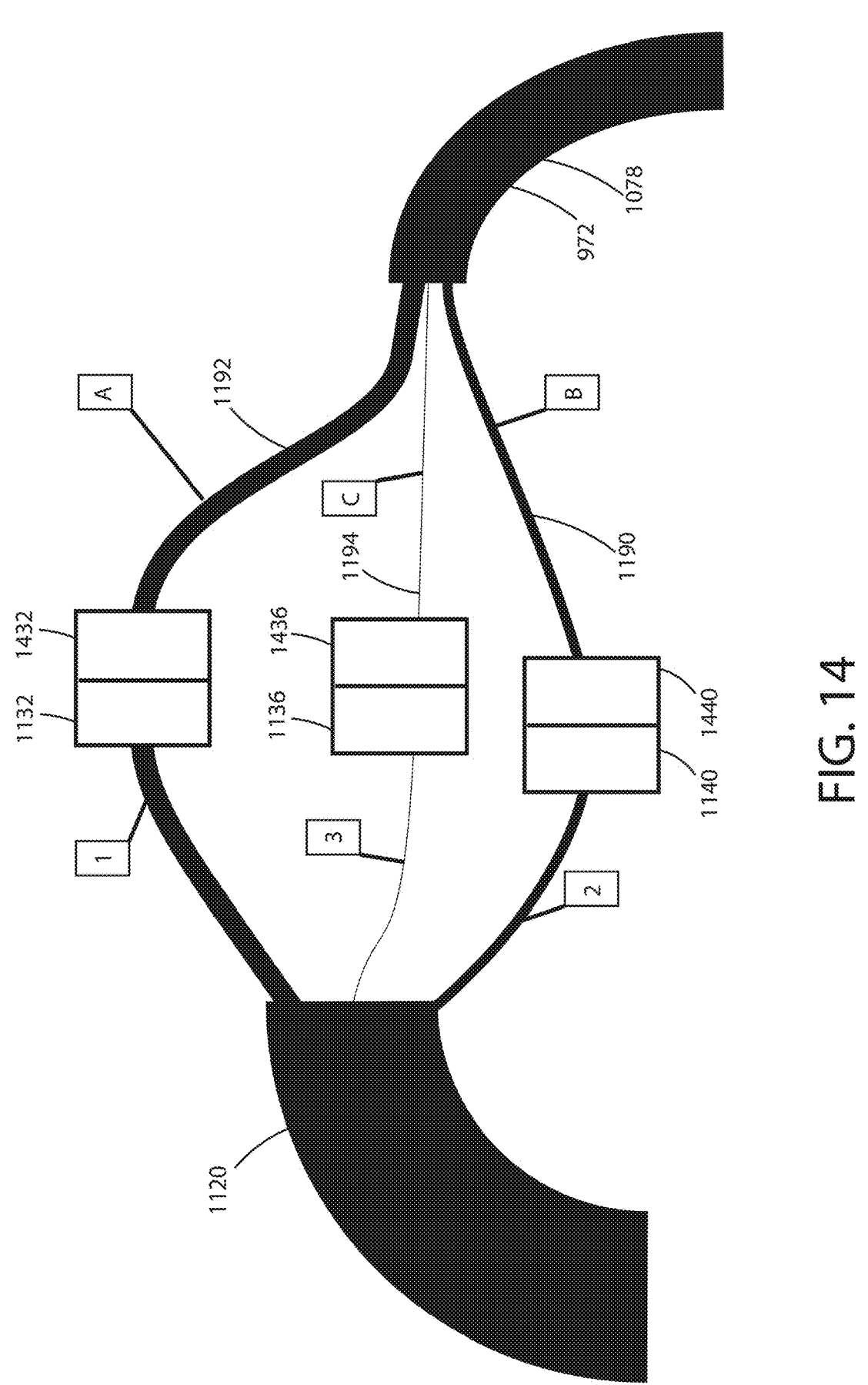
FIG. 14 is a schematic of a damaged end of a cable and an extension cable in accordance with various embodiments herein.

FIG. 14 shows the first portion 1078 of the cable 972 being connected with the extension cable 1120 from a repair kit. Each of the conductors 1190, 1192, 1194 is coupled to a connector 1432, 1436, 1440. The connectors 1432, 1436, 1440 can be connected to the connectors 1132, 1136, 1140 of the extension cable 1120 to electrically connect the conductors of the first portion 1078 of the cable 972 with the conductors of the extension cable 1120. In the embodiments shown in FIG. 14, each of the conductors is connected via an individual connector. However, in some embodiments, a single connector can connect multiple conductors of first portion 1078 of cable 972 with the multiple conductors of the extension cable 1120.

Once the first portion 1078 is connected to the second portion 1080 via the extension cable 1120, the first and second electronic testers 840 can be used to ensure the undamaged end of the first portion 1078 is in electrical communication with the undamaged end of the second portion 1080, such as by sending a communication signal from the first electronic tester 840 through the first portion 1078, the extension cable 1120, and the second portion 1080. Such a test can be conducted prior to reconnecting the undamaged ends to the junction boxes, if they were unattached. FIG. 15 shows a schematic of the first electronic tester 840 connected to the second electronic tester 840 via the first portion 1078, the extension cable 1120, and the second portion 1080.

Figure 16:
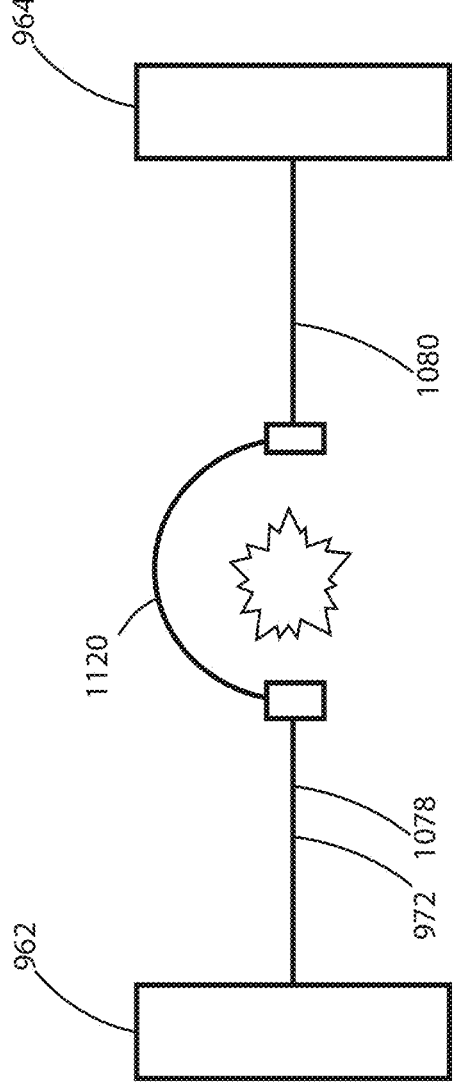
FIG. 16 is a schematic of the damaged electrical system being repaired in accordance with various embodiments herein.

FIG. 16 shows the repaired electrical system. The electrical connection between the second junction box 962 and the third junction box 964 has been restored via the first portion 1078 of cable 972, the extension cable 1120, and the second portion 1080 of the cable 972.

Various embodiments provided herein include an emergency repair kit 130 for triaging and repairing damaged cables as described herein. The repair kit 130 can include one or more handheld electronic testers 840, extension cables, wire strippers and crimp tools, supplies, and manuals needed to assist personnel in wire damage triage and/or repair. Elements of the system can be disposed within a kit or case for easy transportation within the vehicle. FIGS. 17-20 show various arrangements of an emergency repair kit 130.

In various embodiments, the emergency repair kit 130 can include one, two, three, or four handheld electronic testers 840. In various embodiments the emergency repair kit 130 can include a flashlight 1752. In various embodiments, the emergency repair kit 130 can include a wire stripper or splicer 1754. In various embodiments, the emergency repair kit 130 can include a knife and/or crimper. In various embodiments, the emergency repair kit 130 can include a plurality of connectors 1756, such as connectors of different sizes and stored in a box or container. In various embodiments, the emergency repair kit 130 can include a plurality of labels 1758, such as labels for labeling identified conductors of a damaged cable. In various embodiments, the emergency repair kit 130 can further include cables 1244 and 1246 (shown in FIG. 12). These cables 1244 and 1246 can be disposed in the interior volume 1762 of the case 1760 and/or within a container 1766, 1768.

The inclusion of a first crimper and/or a first wire stripper within the case 1760 is strategically designed to enhance the overall efficiency and functionality of the system. The crimper serves as an essential tool capable of deforming connectors to secure them to the ends of conductors, thus ensuring a reliable electrical connection between the repaired sections of damaged cables. Moreover, the inclusion of a wire stripper facilitates the removal of the protective insulation from the conductors without damaging the actual wires. This capability can be used in the preparation of the conductors for the attachment of connectors.

In various embodiments, the emergency repair kit 130 can include a priority guide. The addition of a priority guide within the case can further optimize the repair process by defining a hierarchy of electrical systems based on their criticality. This guide empowers repair personnel to prioritize conductors and systems that are imperative for primary operational functionality of the vehicle, enhancing decision-making under pressure and optimizing resource allocation during the repair process.

In various embodiments, the emergency repair kit 130 can include a plurality of electrical extension cables 1770, 1772, 1774. In various embodiments, each of the electrical extension cables can include at least two different gauges of wire. In various embodiments, the conductors within an electrical extension cable can include one or more conductors (e.g., wires) in the range of 20 gauge to 26 gauge, one or more conductors in the range of 12 gauge to 20 gauge, and one or more wires of 12 gauge or larger (i.e. smaller gauge number).

The plurality of electrical extension cables 1770, 1772, 1774 can be constructed with versatility in mind, encompassing a range of conductor gauges from as small as 26 gauge to robust 12 gauge wires. This wide range ensures compatibility with a variety of systems and signals, supporting both high-current power transmissions and lower-current control signals. The strategic use of these different gauges can be critical for accommodating the diverse wiring needs encountered in complex vehicle systems, enhancing the adaptability and applicability of the repair system in varied operational contexts.

The design of the electrical extension cables further allows them to be connected in a daisy chain configuration, thus facilitating flexibility in repairs where extensions of varying lengths are necessary to bridge larger gaps between severed cable sections. Each conductor is meticulously labeled or mapped to known connector locations, streamlining the repair process by ensuring accurate and reliable reconnections without guesswork. This identification system prioritizes speed and precision, crucial for the rapid reestablishment of system functionality in emergent situations.

In various embodiments, the plurality of conductors of an electrical extension cable comprises more wires of 20 gauge to 26 gauge than from 12 gauge to 18 gauge. In various embodiments, the plurality of conductors of an electrical extension cable comprises more wires of 12 gauge to 18 gauge than less than 12 gauge. In various embodiments, the plurality of conductors in an electrical extension cable comprises at least 100 wires. In various embodiments, the plurality of conductors of an electrical extension cable comprises at least 2 wires and not more than 128 wires. In various embodiments, the plurality of conductors of an electrical extension cable are each labeled or connected to a known location in a connector. In various embodiments, each of the electrical extension cables of the plurality of electrical extension cables is of the same construction, such that each of the electrical extension cables comprises the same type of and number of conductors disposed within.

In various embodiments, the plurality of electrical extension cables comprises at least 50 feet of electrical extension cable in aggregate. In various embodiments, the plurality of electrical extension cables are configured to be able to be connected to each other in a daisy chain configuration. In various embodiments, the plurality of electrical extension cables comprises at least one cable that is at least 2 feet long and not more than 6 feet long, and at least one cable that is at least 9 feet long and not more than 20 feet long. In various embodiments, the plurality of electrical extension cables comprises at least one cable that is about 3 feet long, at least one cable that is about 6 feet long, at least one cable that is about 9 feet long, at least one cable that is about 12 feet long, and at least one cable that that is about 15 feet long.

In various embodiments, the emergency repair kit 130 can include a case 1760. The case can define an interior volume 1762. The case 1760 can be a waterproof case, such that water cannot enter the interior volume when the lid 1764 is in a closed and locked position. FIGS. 17-20 show the lid 1764 in an open position, rotated away from the remainder of the case 1760.

In addition, the structural dimensions of the case 1760, ranging from 24 inches to a maximum of 60 inches in length and width, with varying heights up to 36 inches, are designed to accommodate all necessary components robustly while remaining portable. In various embodiments, the case is at least 24 inches long, at least 24 inches wide, and at least 12 inches tall. In various embodiments, the case is no more than 60 inches long, no more than 60 inches wide, and no more than 36 inches tall.

The waterproof feature of the case ensures the protection of sensitive electronic and mechanical components, maintaining their integrity even in adverse environmental conditions, and further exemplifies the system's readiness for deployment in demanding operational theaters. In various embodiments, the case is waterproof, such that water cannot enter the interior volume when the case is securely closed.

In various embodiments, the emergency repair kit 130 can include one or more containers 1766, 1768. In some embodiments, the containers 1766, 1768 can be in the form a backpack. In various embodiments, the first container and/or the second container is a backpack comprising at least two shoulder straps and a zipper providing access to an interior volume. In various embodiments, the first container is the same construction as the second container. FIGS. 17-20 show the containers 1766, 1768 schematically for clarity.

In various embodiments, the components of the emergency repair kit 130 can be disposed within the interior volume 1762 of the case 1760. In various embodiments, the components of emergency repair kit 130 including the flashlight 1752, splicer 1754, electronic testers 840, extension cables 1770, 1772, 1774, labels 1758, connectors 1756, priority guide, knife, and wire stripper can be disposed within a first container 1766 and/or second container 1768. In some embodiments, the contents of the first container 1766 can be the same as the contents of the second container 1768.

Figure 17:
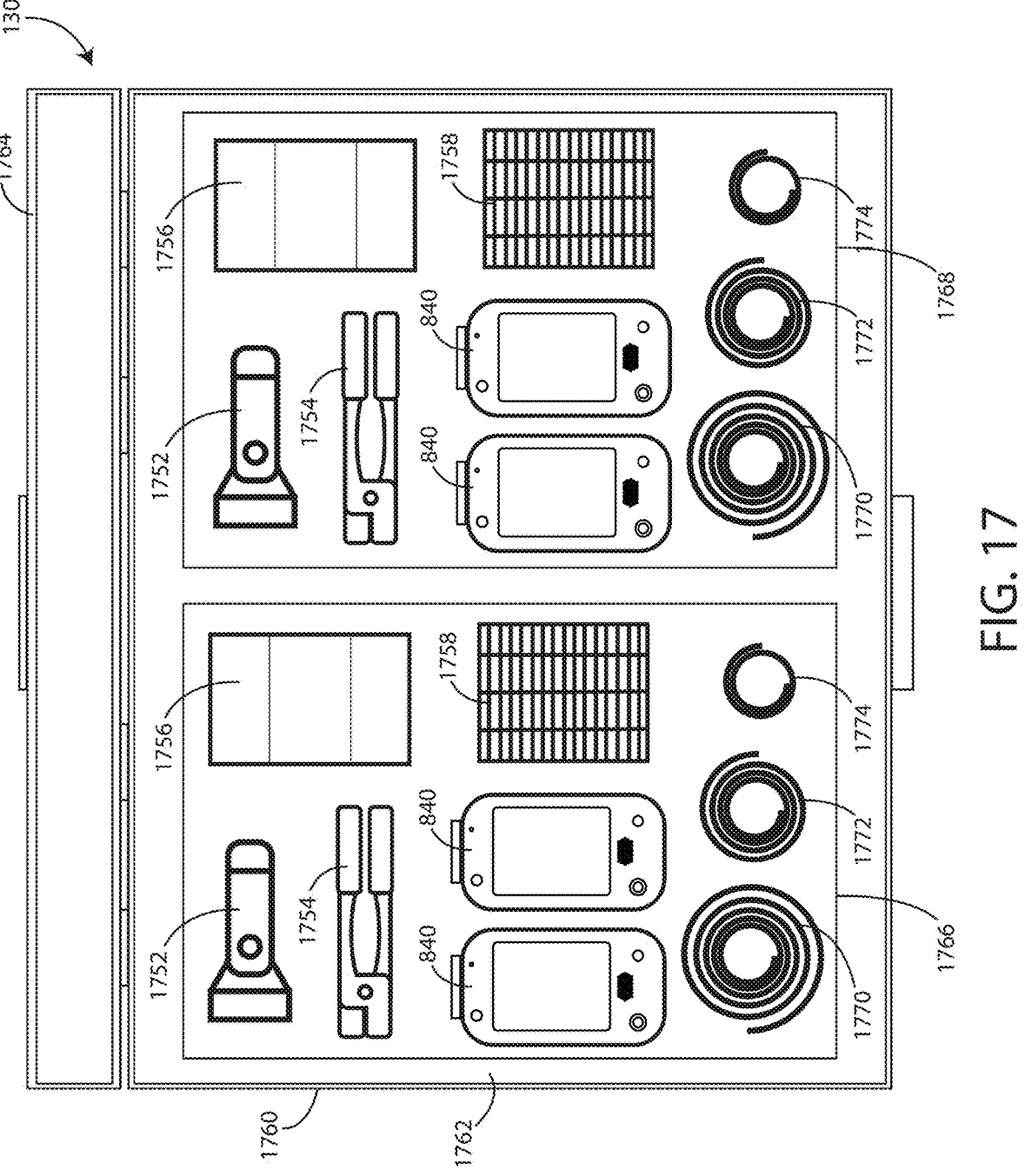
FIG. 17 is a schematic of an emergency repair kit system in accordance with various embodiments herein.

FIG. 17 shows an embodiment of the emergency repair kit 130 including a case 1760. A first container 1766 and a second container 1768 are disposed within the interior volume 1762 of the case 1760. A flashlight 1752, a wire splicer 1754, connectors 1756, labels 1758, two electronic testers 840, and a plurality of extension cables 1770, 1772, 1774 can be disposed within the first container 1766. A flashlight 1752, a wire splicer 1754, connectors 1756, labels 1758, two electronic testers 840, and a plurality of extension cables 1770, 1772, 1774 can be disposed within the second container 1768.

Figure 18:
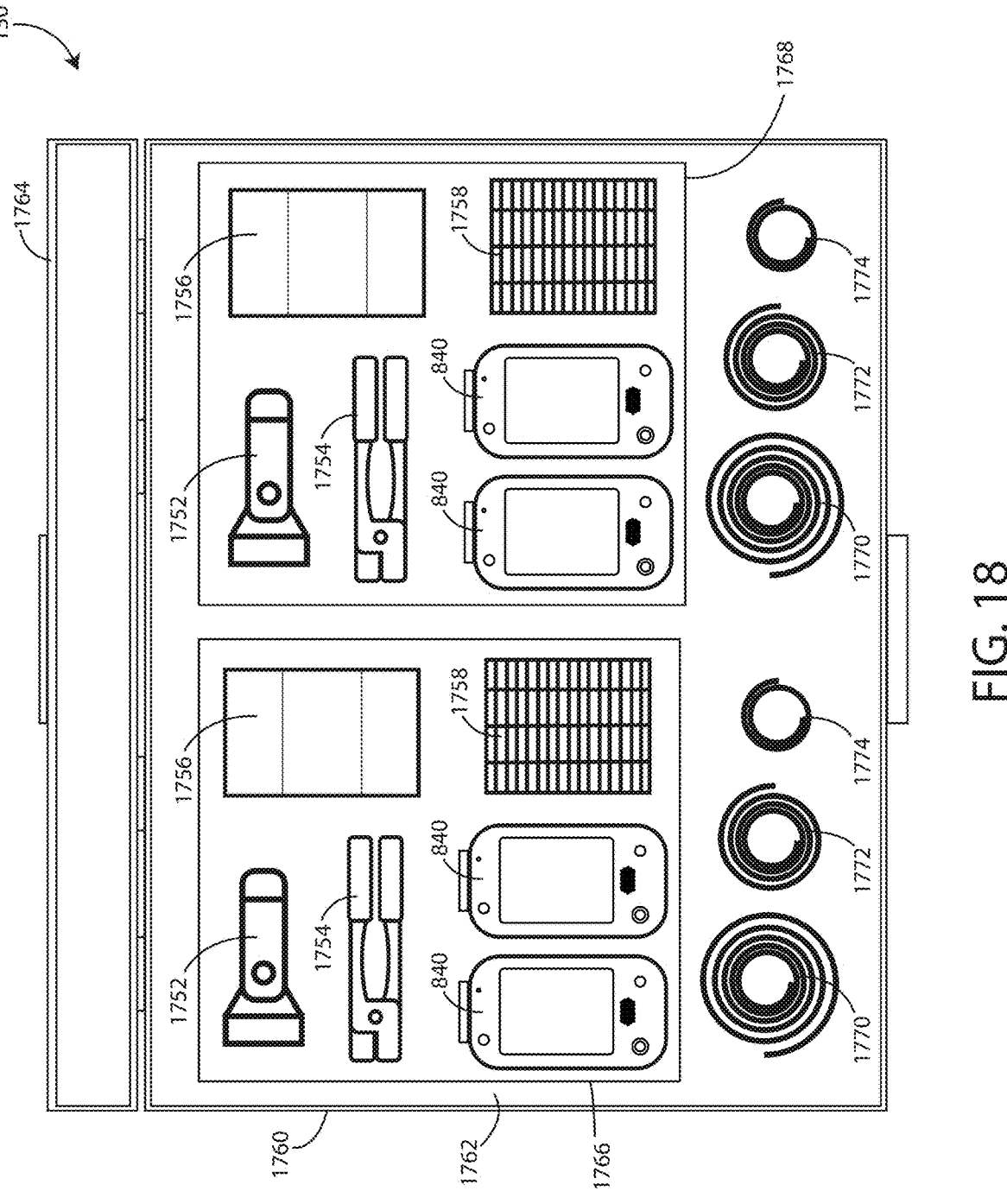
FIG. 18 is a schematic of an emergency repair kit system in accordance with various embodiments herein.

FIG. 18 shows a similar emergency repair kit 130 as shown in FIG. 17 including a case 1760, two containers 1766, 1768, a flashlight 1752, a wire splicer 1754, connectors 1756, labels 1758, two electronic testers 840, and a plurality of extension cables 1770, 1772, 1774. In the embodiment of FIG. 18, the extension cables 1770, 1772, 1774 are disposed within the interior volume 1762, but not within the containers 1766, 1768.

Figure 19:
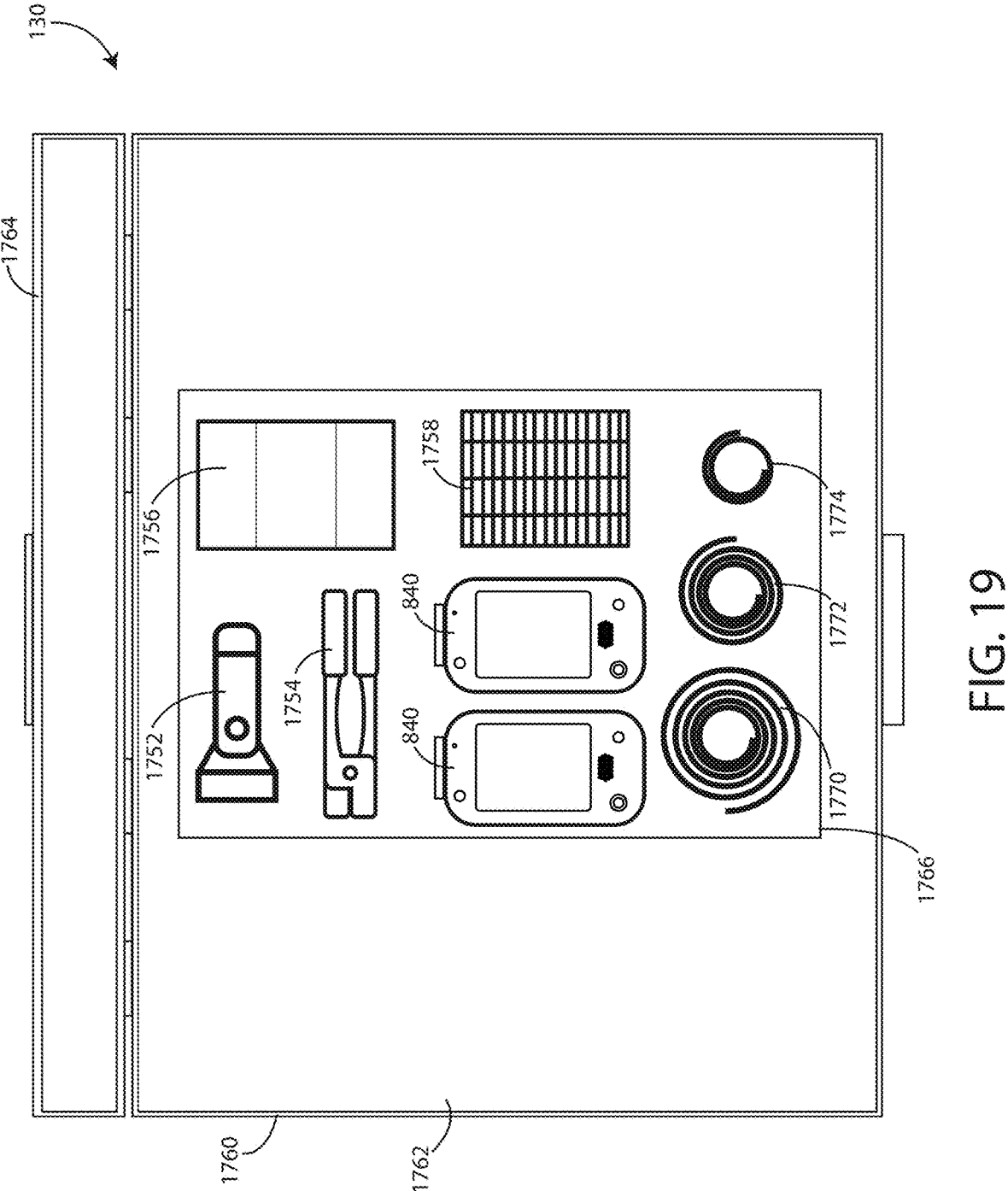
FIG. 19 is a schematic of an emergency repair kit system in accordance with various embodiments herein.
Figure 20:
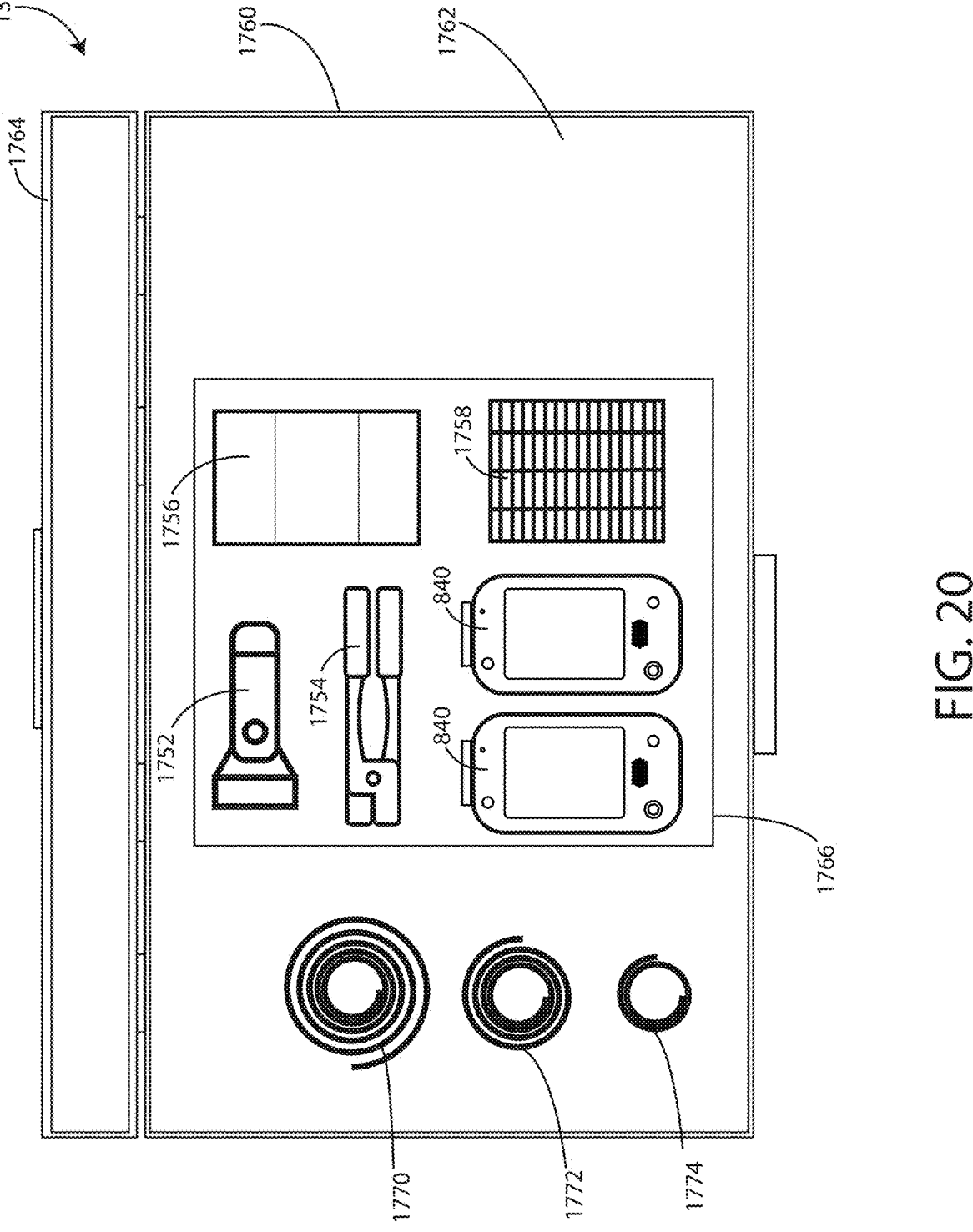
FIG. 20 is a schematic of an emergency repair kit system in accordance with various embodiments herein.

In some embodiments, a single set of components can be disposed within the interior volume 1762 of a case 1760, such as shown in FIGS. 19 and 20. In FIG. 19, a flashlight 1752, a wire splicer 1754, connectors 1756, labels 1758, two electronic testers 840, and a plurality of extension cables 1770, 1772, 1774 are disposed within the first container 1766. In the embodiment of FIG. 20, the extension cables 1770, 1772, 1774 are disposed within the interior volume 1762, but not within the container.

FIG. 21 shows a method of repairing an electrical system on a vehicle in accordance with various embodiments herein. The method can include detecting a disruption to the electrical system on the vehicle 2102. A first cable can have been separated into a first portion and a second portion. In various embodiments, the first portion of the first cable is electrically separated from the second portion of the first cable as a result of the disruption to the electrical system.

The method can include locating a non-damaged end of the first portion and connecting the non-damaged end of the first portion to a first handheld electronic tester 2104. In various embodiments, connecting the non-damaged end of the first portion to a first handheld electronic tester can include connecting the first handheld electronic tester to a junction box that that the non-damaged end of the first portion is already electrically connected to. The method can include locating a damaged end of the first portion and connecting the damaged end of the first portion to a second handheld electronic tester 2106. The method can include identifying, at the damaged end, a first conductor within the first portion by sending a signal from one of the handheld electronic testers to the other handheld electronic testers through the first conductor 2108. In various embodiments, the first conductor is one of a plurality of conductors within the first cable.

The method can include connecting, at the damaged end, the first conductor to a first connector 2110. The method can include locating a non-damaged end of the second portion and connecting the non-damaged end of the second portion to one of the handheld electronic testers 2112. In various embodiments, connecting the non-damaged end of the second portion to a handheld electronic tester can include connecting the handheld electronic tester to a junction box that that the non-damaged end of the second portion is already electrically connected to. The method can include locating a damaged end of the second portion and connecting the damaged end of the second portion to either the first handheld electronic tester or the second handheld electronic tester 2114. The method can include identifying, at the damaged end, the first conductor within the second portion by sending a signal from a handheld electronic testers to the other handheld electronic testers through the first conductor 2116. The method can include connecting, at the damaged end, the first conductor to a second connector 2118. The method can include electrically connecting the first connector with the second connector 2120.

In various embodiments, the method can further include testing to ensure the non-damaged end of the first portion of the first conductor is in electrical communication with the non-damaged end of the second portion of the first conductor.

In various embodiments, electrically connecting the first connector with the second connector can include connecting a first end of an electrical extension cable with the first connector and a second end of the electrical cable with the second connector. In various embodiments, the electrical extension cable is one of a plurality of electrical extension cables in an emergency repair kit before the disruption is detected. In various embodiments, the first handheld electronic tester and the second handheld electronic tester are in the emergency repair kit before the disruption is detected. In various embodiments, the first handheld electronic tester and the second handheld electronic tester are similarly built, such that the two can be interchanged for each other.

In various embodiments, electrically connecting the first connector with the second connector comprises directly connecting the first connector with the second connector.

In various embodiments, the method can further include labeling the first conductor of the first portion, once identified, prior to connecting the first conductor of the first portion to the first connector; and labeling the first conductor of the second portion, once identified, prior to connecting the first conductor of the second portion to the second connector.

Electronic Tester

In various embodiments, the system can include handheld electronic tester or a portable wiring analyzer, such as a DIT-MCO HT-128, a DIT-MCO HT-128B, or a DIT-MCO Model 2635 portable wiring analyzer. The analyzer can have the capacity to connect and test multiple conductors at the same time. In some embodiments, the handheld electronic tester can include 128 test pins for connections to 128 conductors.

In some embodiments, the handheld electronic tester or analyzer can include a special random hookup interface optimized for triage and repair in emergency situations. The Model 2635 has 400 test points of standard switching, with the ability to expand up to 900 test points. It is small, lightweight, and portable. It tests wiring and components for leakage, resistance, voltage, and capacitance. With up to 1,500 VDC and 2 A test stimulus, the Model 2635-B provides reliable fault detection and troubleshooting. It is capable of testing continuity down to 0.01Ω. The Model 2635's size and weight make it suitable for test portability. It can be placed right next to the cable/connector needing to be tested, allowing for shortened adapter cables from the connector under test and the analyzer.

In various embodiments, the system can further include a remote probe. The remote probe can significantly enhance the efficiency of identifying critical wires needing repair and reconnection.

The probe can be a peripheral device that allows the analyzer to route the stimulus/measurement bus to the handheld probe, so that the user may perform troubleshooting and analysis on their product. It is typically used with continuity tests to determine connector pins and locations. Once the probe is connected to one of the switching units and enabled, it routes the stimulus and measurement signals to the tip of the probe, allowing the user to troubleshoot their system or product. Utilizing the analyzer stimulus, the probe measures continuity while simultaneously being powered by the analyzer. It utilizes an interface for the user to receive instructions on the current task and have remote prompts for full control from the test suite software. The probe can include a graphical display to present the measurement points and results, along with visual notification of Pass/Fail. Buttons are located on the front face to control the probe and configure the probe. The probe can communicate RS485 as a slave on a dedicated RS485 Bus to the Switching Unit Motherboard. Additional provisions can be made to allow for wireless communication, such as Bluetooth. The Switching Unit Motherboard will provide power, communication, and stimulus to the probe. The probe can support a minimum cable length to the Switch Box of 20 meters and will allow for one-handed operation of the controls and the display. The probe can operate from −10 to 60 degrees Celsius. It will operate up to 90% relative humidity (non-condensing) at 60 degrees Celsius.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method for repairing an electrical system on a vehicle, comprising:

detecting a disruption to the electrical system on the vehicle, wherein a first cable is separated into a first portion and a second portion;

locating a non-damaged end of the first portion and connecting the non-damaged end of the first portion to a first handheld electronic tester;

locating a damaged end of the first portion and connecting the damaged end of the first portion to a second handheld electronic tester;

identifying, at the damaged end, a first conductor within the first portion by sending a signal from either the first handheld electronic tester or the handheld electronic tester to the other of the first or second handheld electronic tester through the first conductor;

connecting, at the damaged end, the first conductor to a first connector;

locating a non-damaged end of the second portion and connecting the non-damaged end of the second portion to a third handheld electronic tester;

locating a damaged end of the second portion and connecting the damaged end of the second portion to a fourth handheld electronic tester;

identifying, at the damaged end, the first conductor within the second portion by sending a signal from one of the third or fourth handheld electronic testers to the other of the third or fourth handheld electronic testers through the first conductor;

connecting, at the damaged end, the first conductor to a second connector; and electrically connecting the first connector with the second connector.

2. The method of claim 1, further comprising: testing to ensure the non-damaged end of the first portion of the first conductor is in electrical communication with the non-damaged end of the second portion of the first conductor.

3. The method of claim 1, wherein electrically connecting the first connector with the second connector comprises connecting a first end of an electrical extension cable with the first connector and a second end of the electrical cable with the second connector.

4. The method of claim 3, wherein the electrical extension cable is selected from a plurality of electrical extension cables in an emergency repair kit.

5. The method of claim 4, wherein the first handheld electronic tester, the second handheld electronic tester, the third handheld electronic tester, and the fourth handheld electronic tester are removed from the emergency repair kit.

6. The method of claim 1, wherein electrically connecting the first connector with the second connector comprises directly connecting the first connector with the second connector.

7. The method of claim 1, further comprising:

labeling the first conductor of the first portion, once identified, prior to connecting the first conductor of the first portion to the first connector; and labeling the first conductor of the second portion, once identified, prior to connecting the first conductor of the second portion to the second connector.

8. The method of claim 1, wherein the first portion of the first cable is electrically separated from the second portion of the first cable as a result of the disruption to the electrical system.

9. The method of claim 1, wherein the first conductor is one of a plurality of conductors within the first cable.

10. The method of claim 1, wherein the first handheld electronic tester and the second handheld electronic tester are functionally identical, such that the two can be interchanged for each other.

* * * * *